Oct. 12, 1937.    A. AMES, JR    2,095,235
METHOD AND INSTRUMENT FOR TESTING EYES
Filed Jan. 13, 1934    16 Sheets-Sheet 3
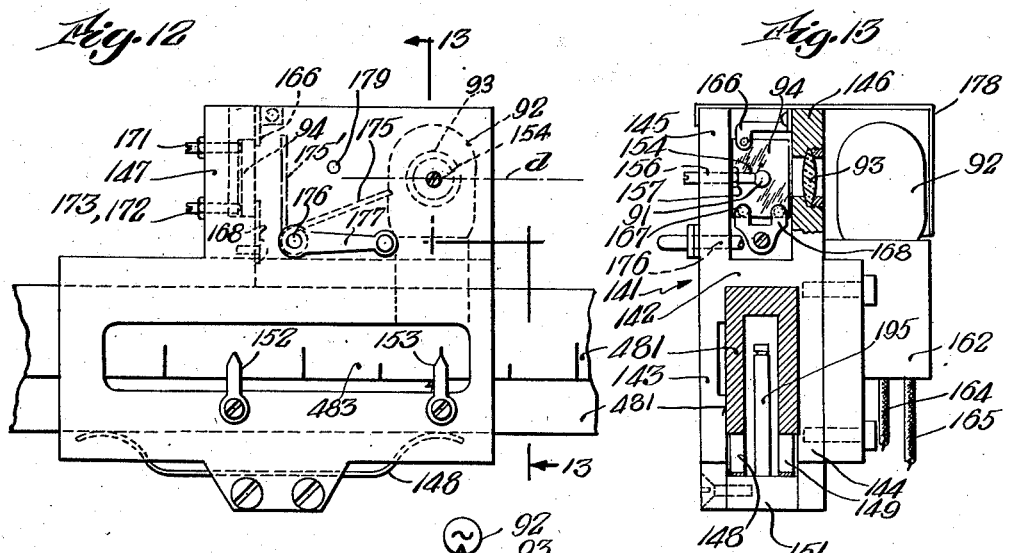
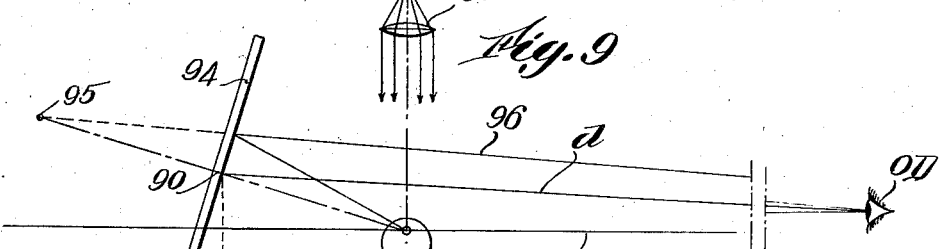
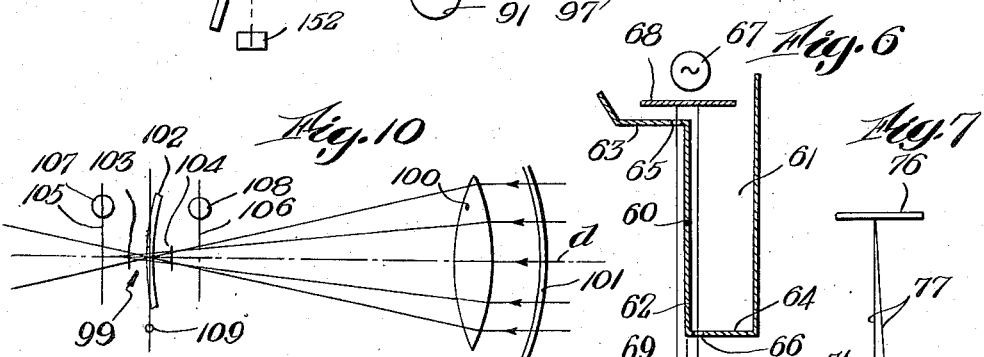
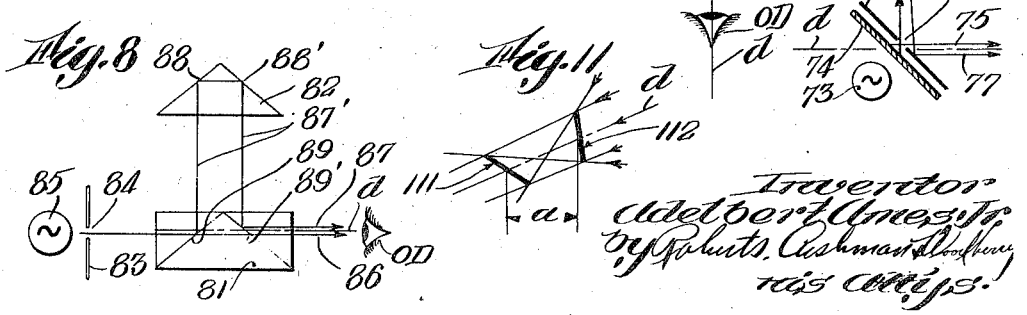

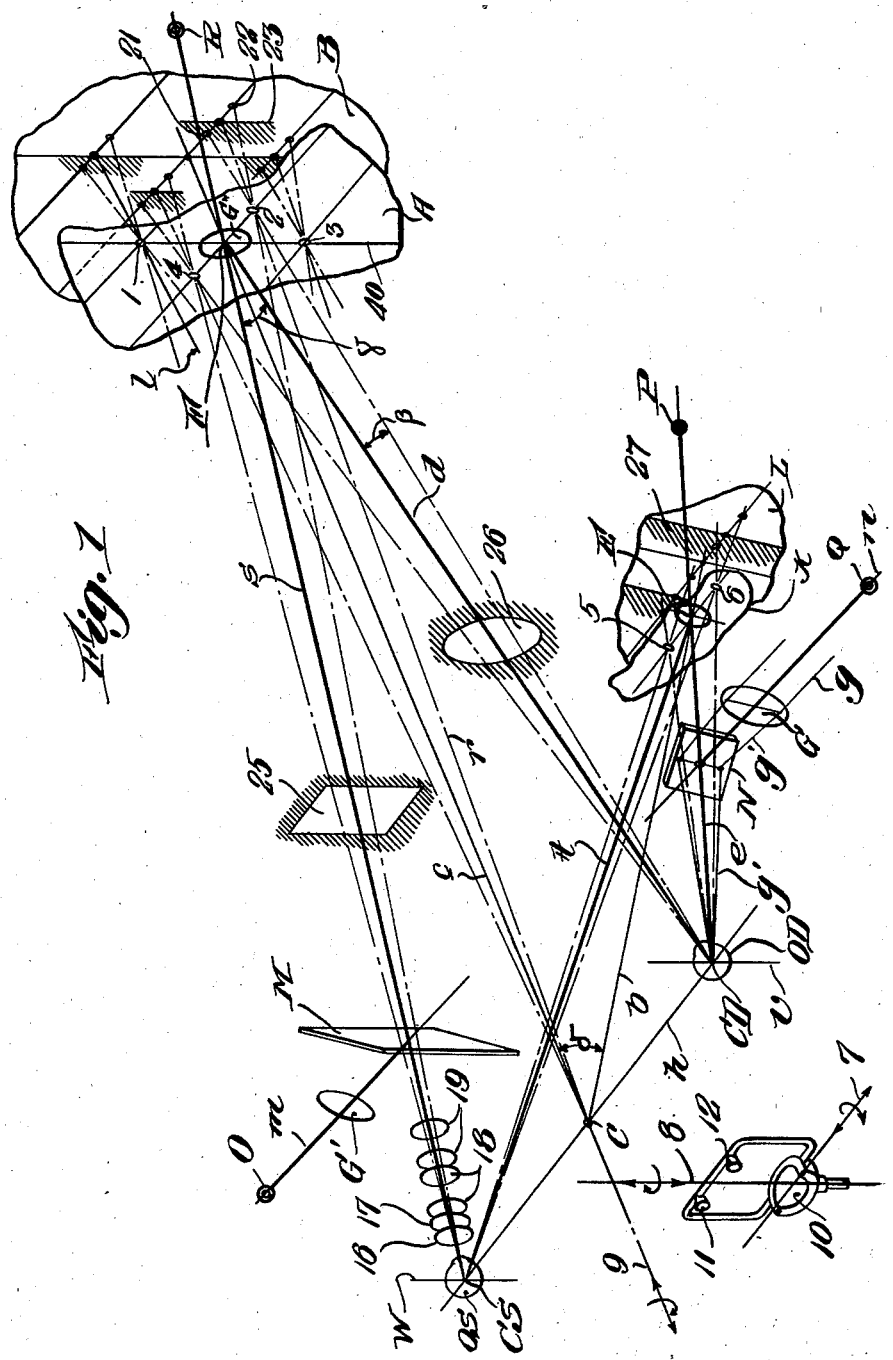

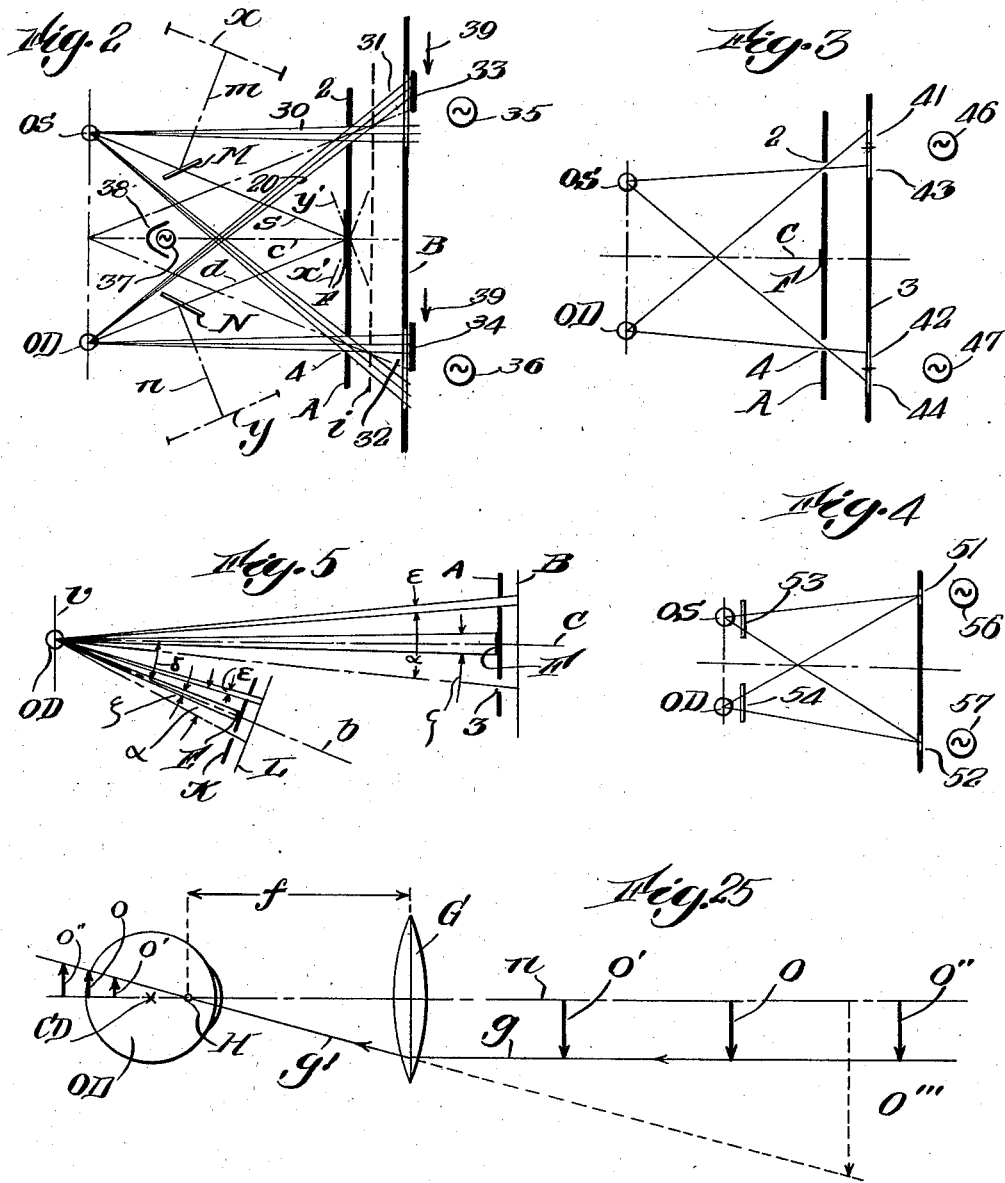

Oct. 12, 1937.  A. AMES, JR  2,095,235
METHOD AND INSTRUMENT FOR TESTING EYES
Filed Jan. 13, 1934  16 Sheets-Sheet 4
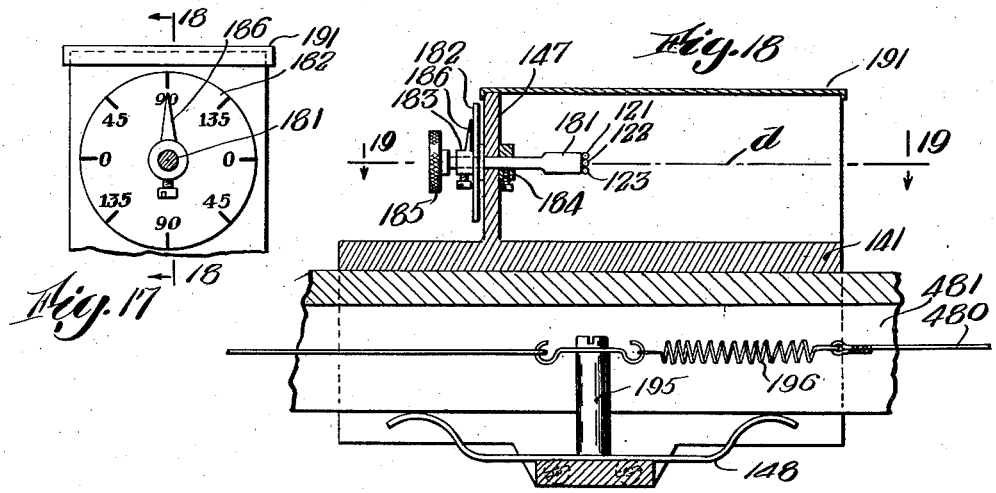
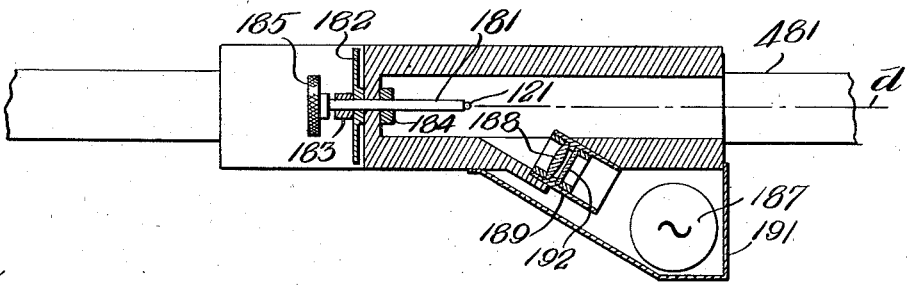
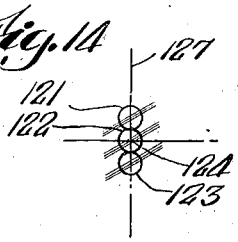
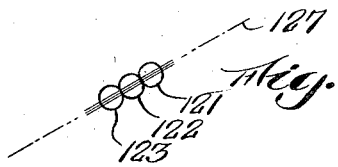

Oct. 12, 1937.  A. AMES, JR  2,095,235
METHOD AND INSTRUMENT FOR TESTING EYES
Filed Jan. 13, 1934  16 Sheets—Sheet 5
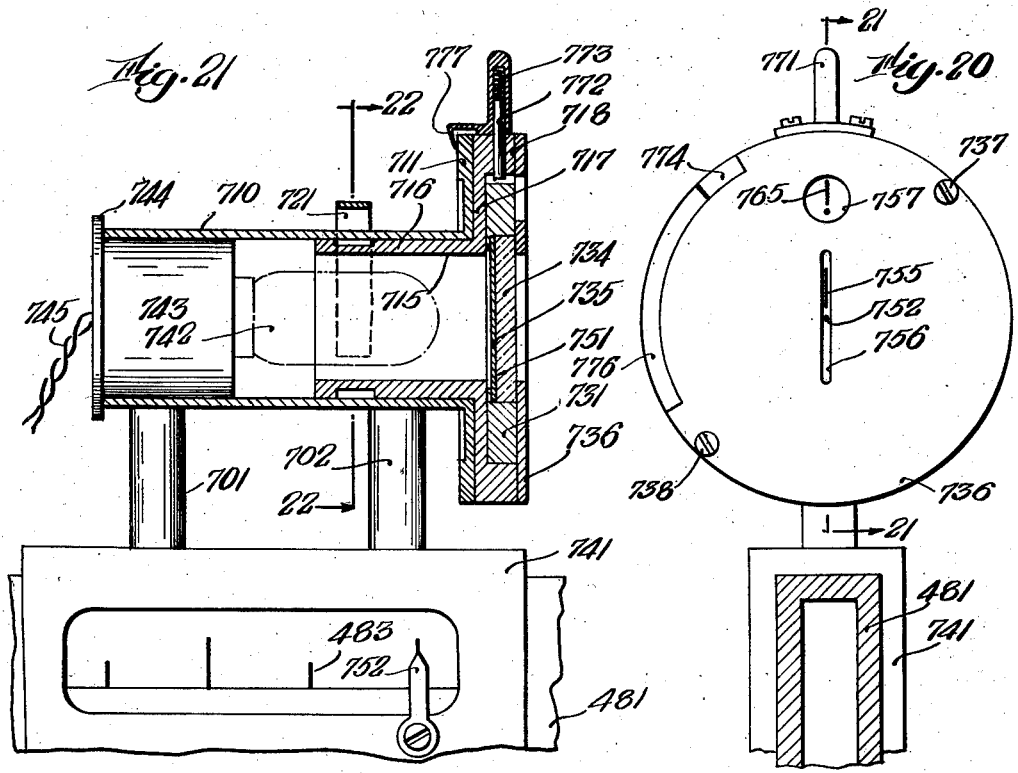
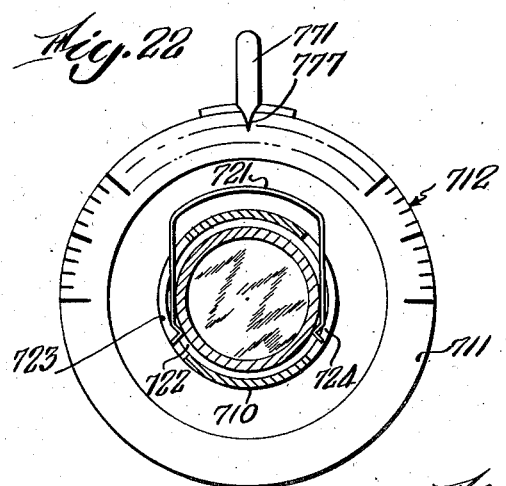
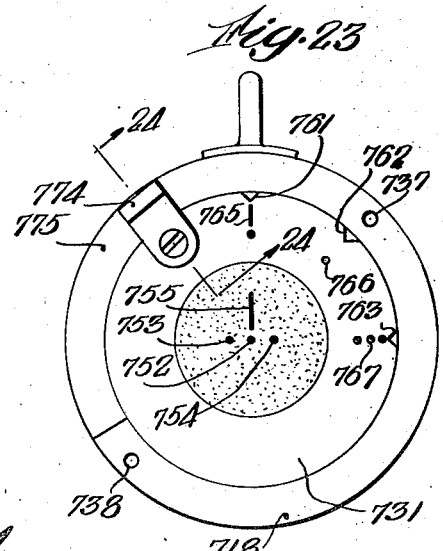
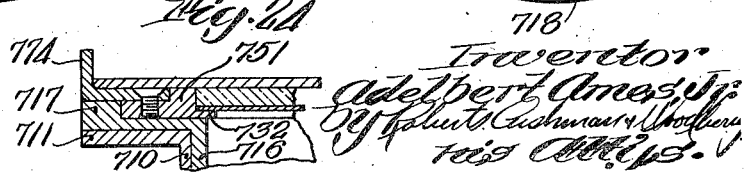

Oct. 12, 1937.    A. AMES, JR.    2,095,235
METHOD AND INSTRUMENT FOR TESTING EYES
Filed Jan. 13, 1934    16 Sheets-Sheet 6
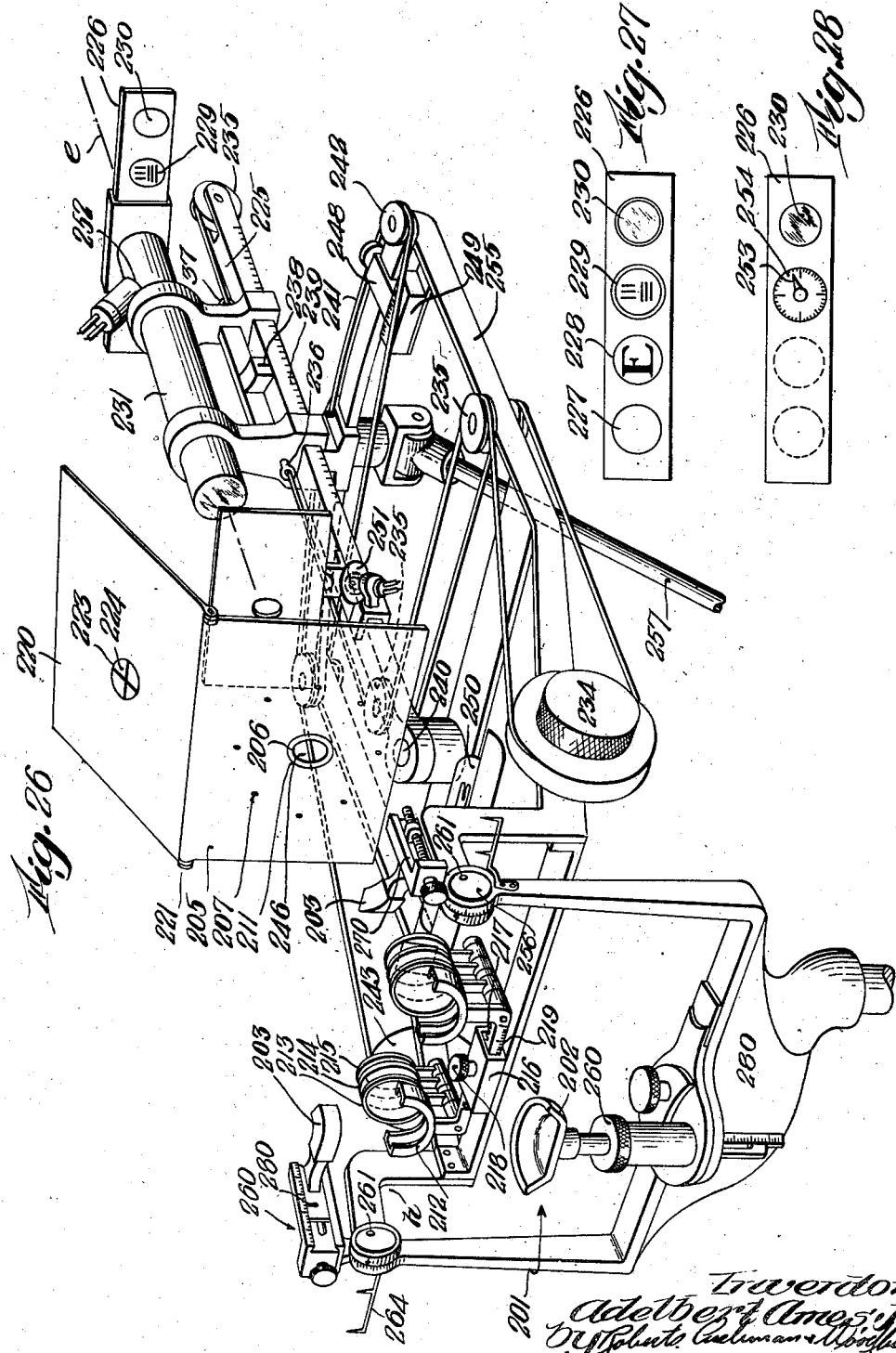

Oct. 12, 1937. A. AMES, JR 2,095,235
METHOD AND INSTRUMENT FOR TESTING EYES
Filed Jan. 13, 1934 16 Sheets-Sheet 7
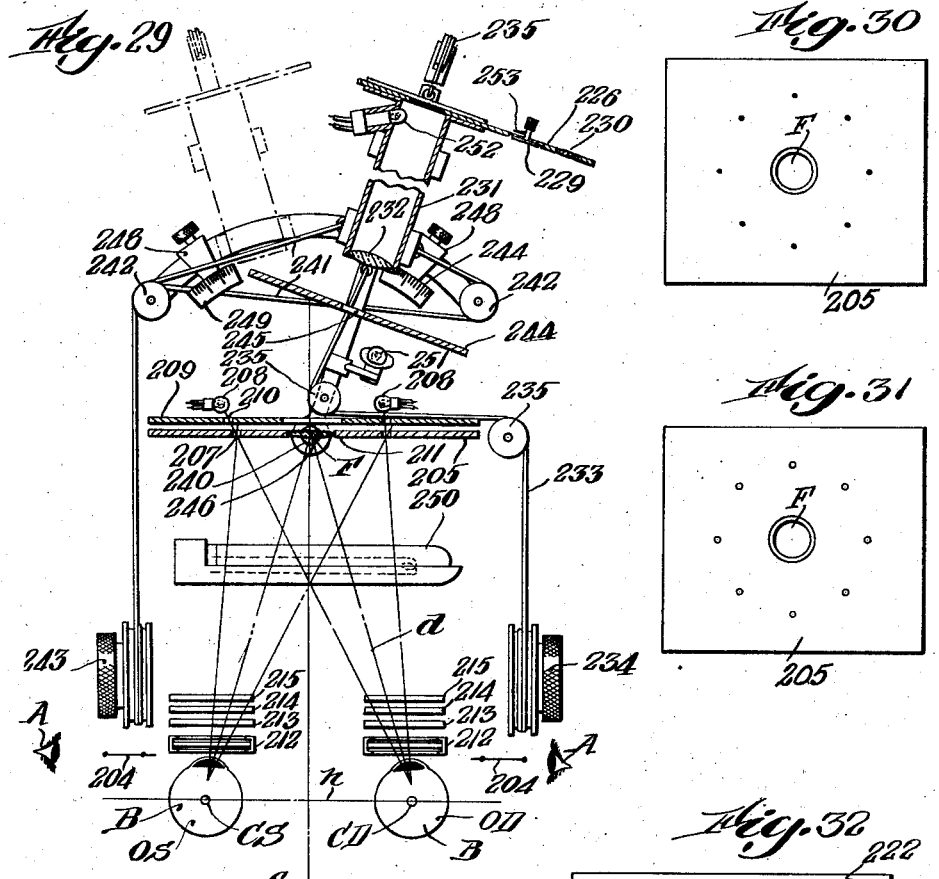
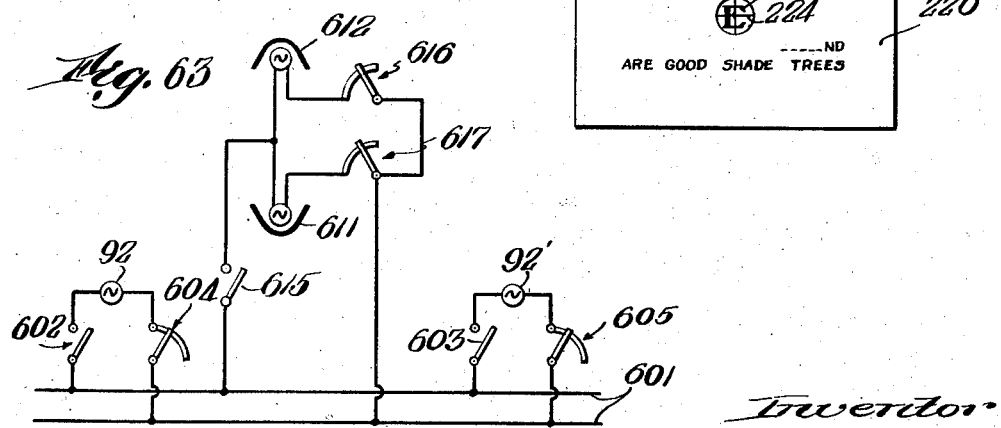

Oct. 12, 1937.  A. AMES, JR  2,095,235
METHOD AND INSTRUMENT FOR TESTING EYES
Filed Jan. 13, 1934  16 Sheets-Sheet 8
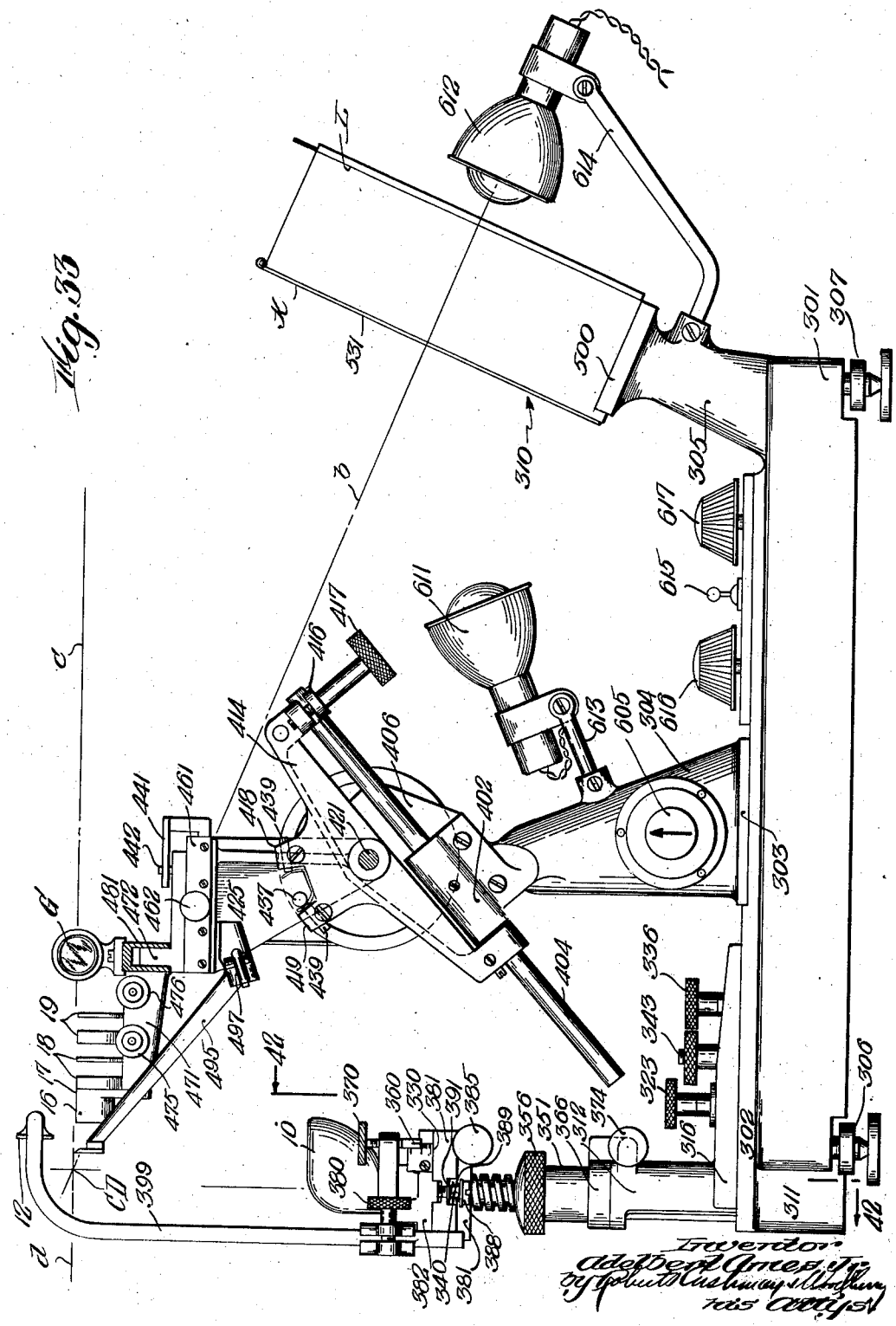

Oct. 12, 1937.  A. AMES, JR  2,095,235
METHOD AND INSTRUMENT FOR TESTING EYES
Filed Jan. 13, 1934  16 Sheets-Sheet 9
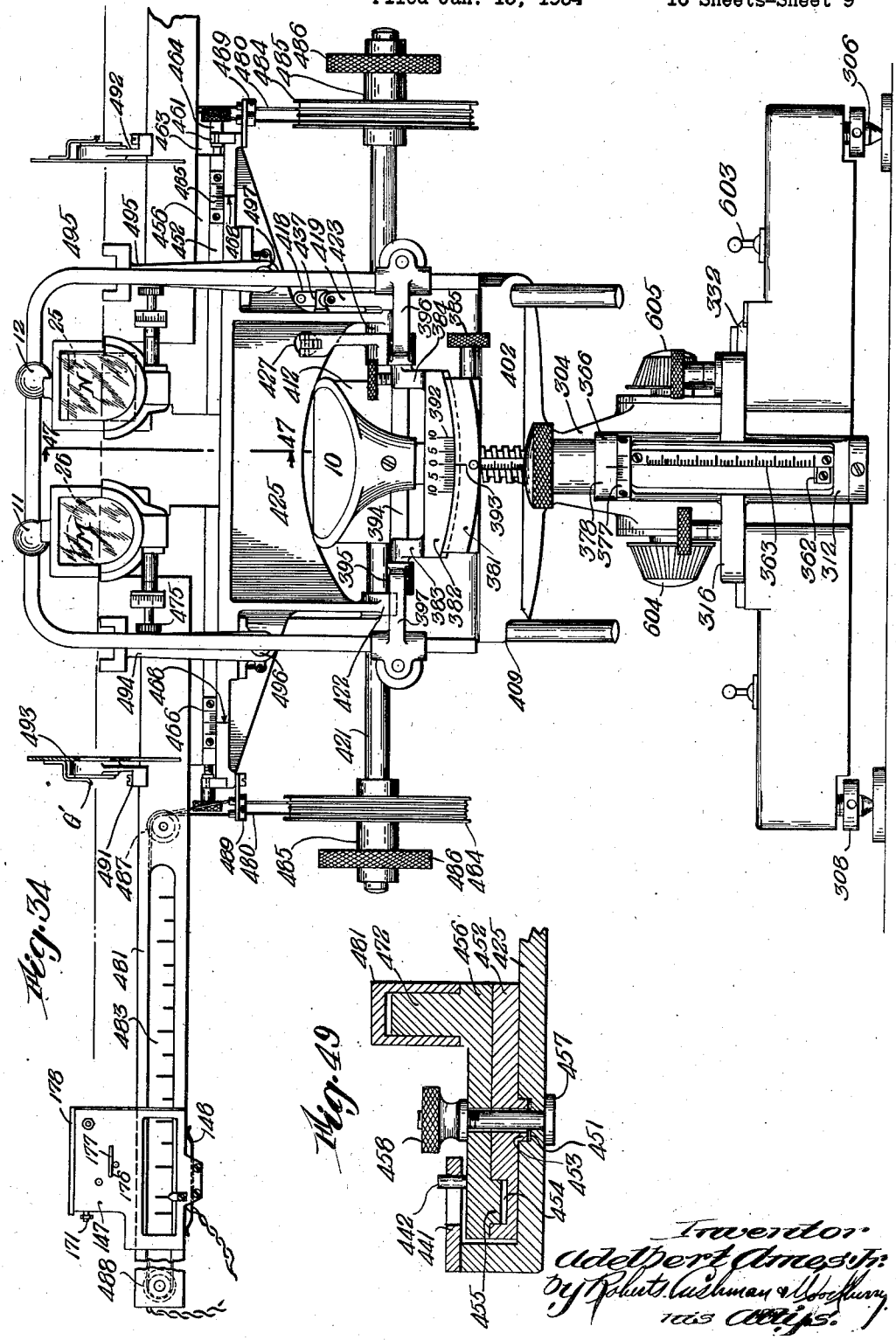

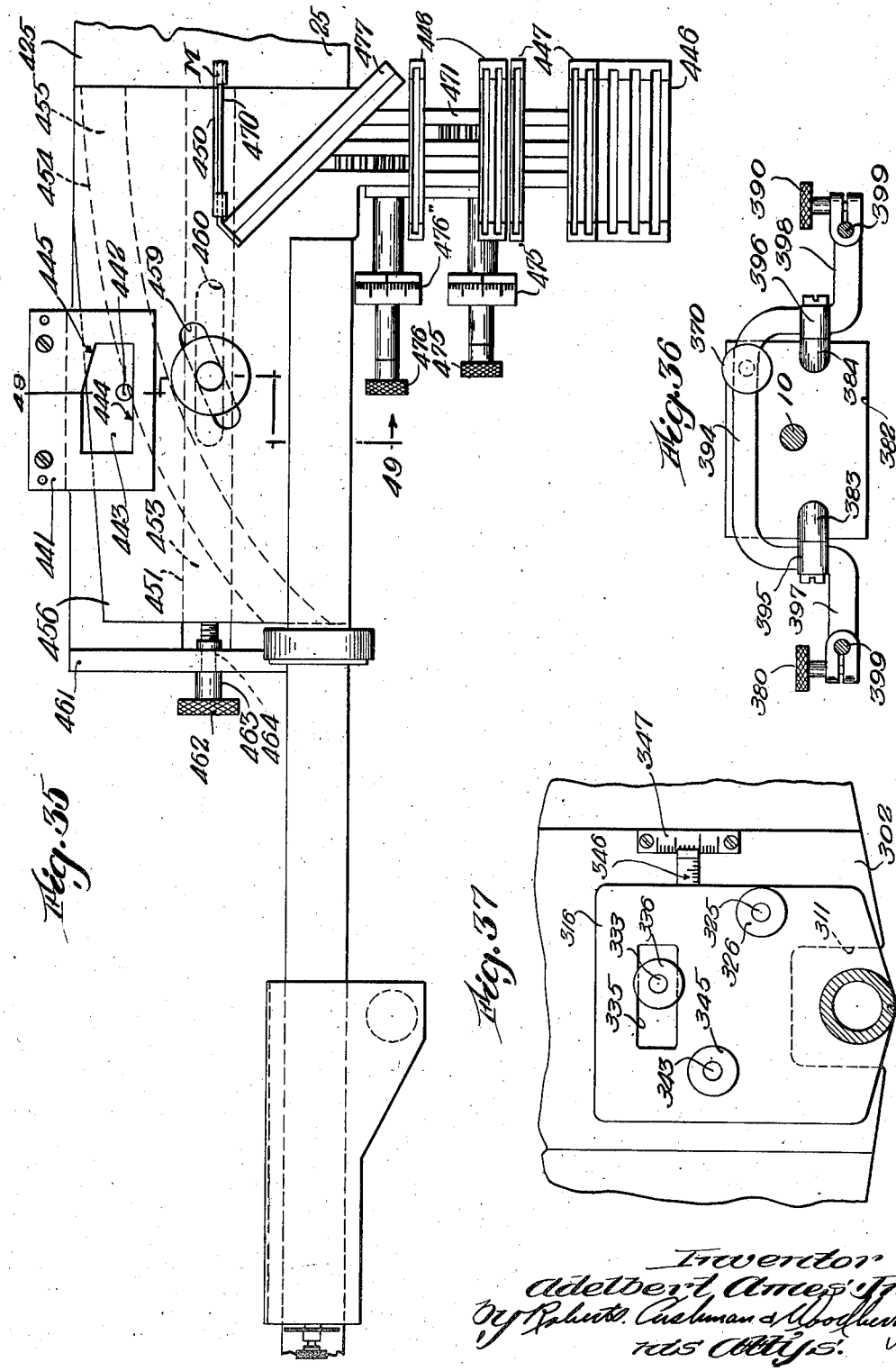

Oct. 12, 1937.    A. AMES, JR    2,095,235
METHOD AND INSTRUMENT FOR TESTING EYES
Filed Jan. 13, 1934    16 Sheets-Sheet 11
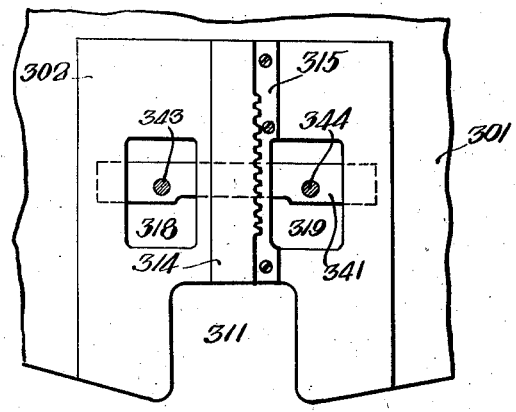
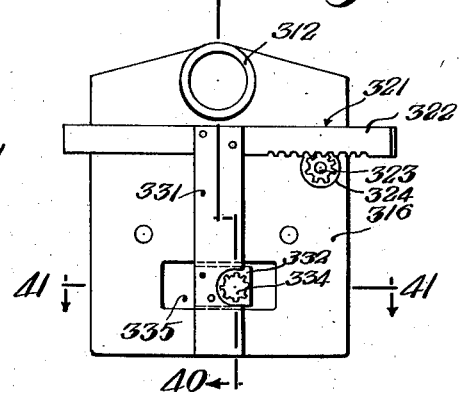
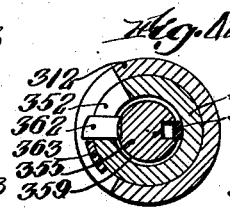
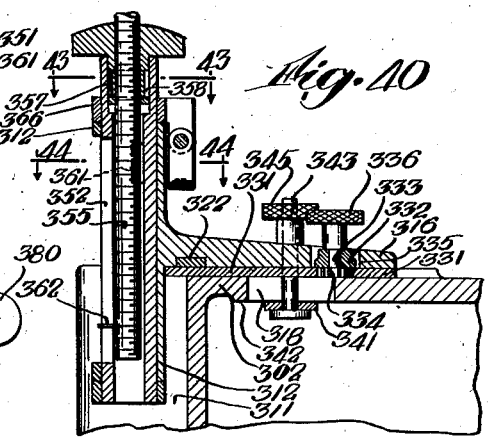
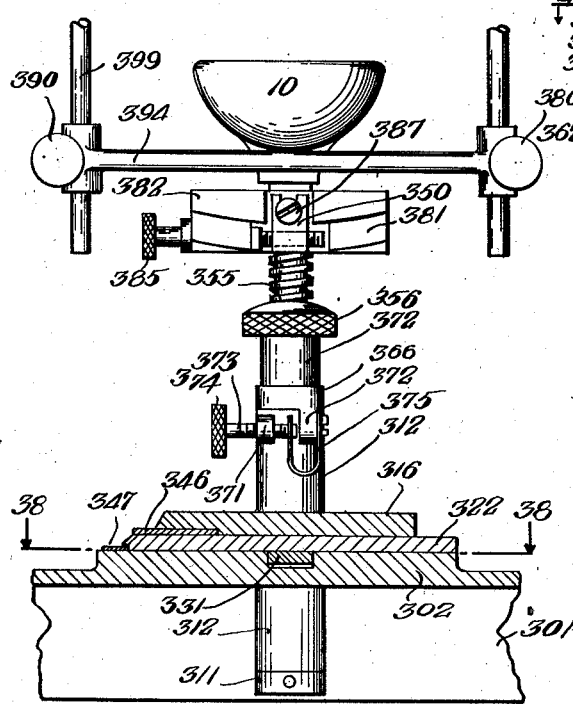
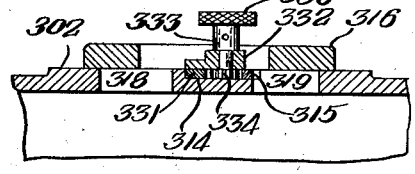

Oct. 12, 1937.  A. AMES, JR  2,095,235
METHOD AND INSTRUMENT FOR TESTING EYES
Filed Jan. 13, 1934  16 Sheets-Sheet 12
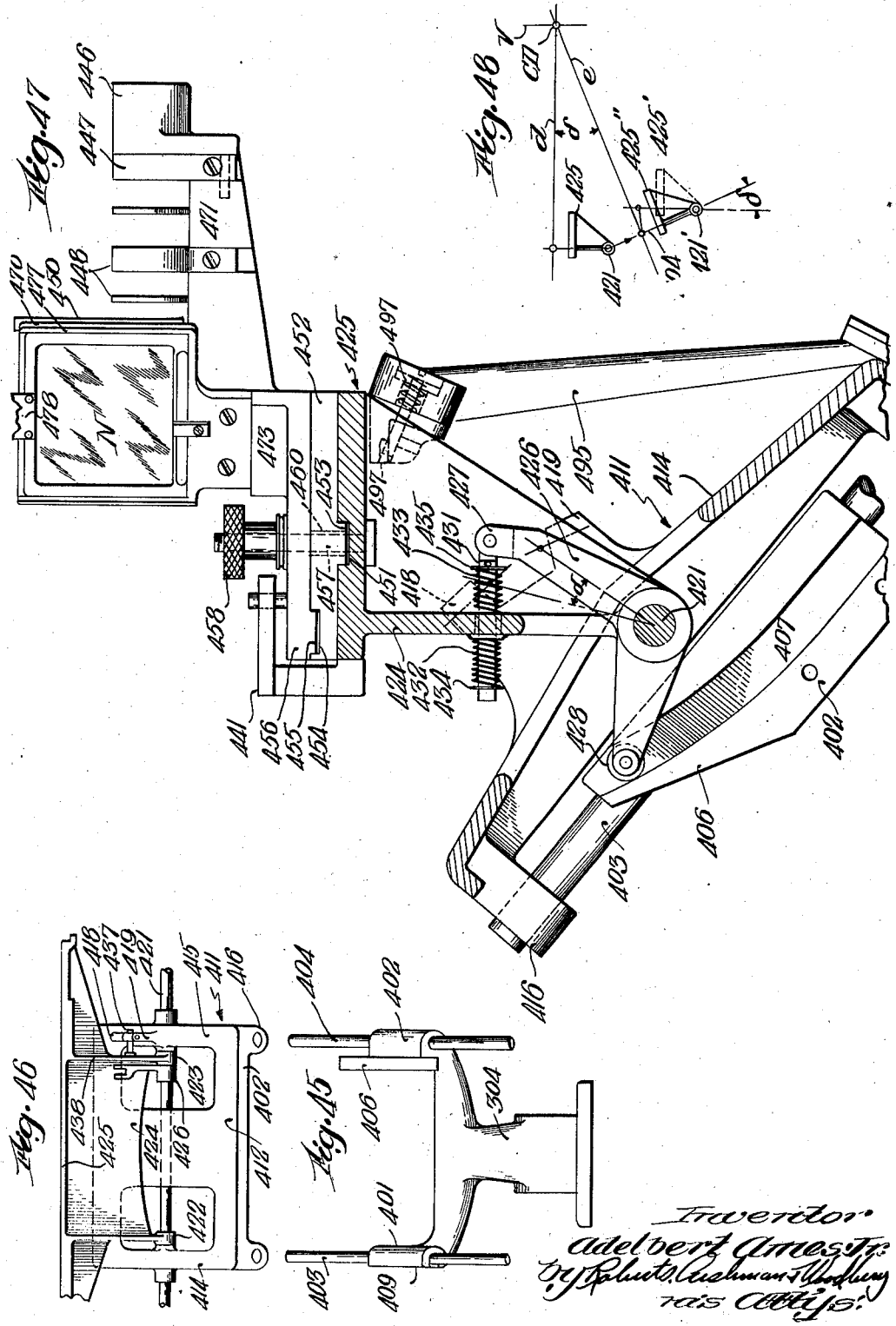

Oct. 12, 1937.  A. AMES, JR  2,095,235
METHOD AND INSTRUMENT FOR TESTING EYES
Filed Jan. 13, 1934  16 Sheets-Sheet 13
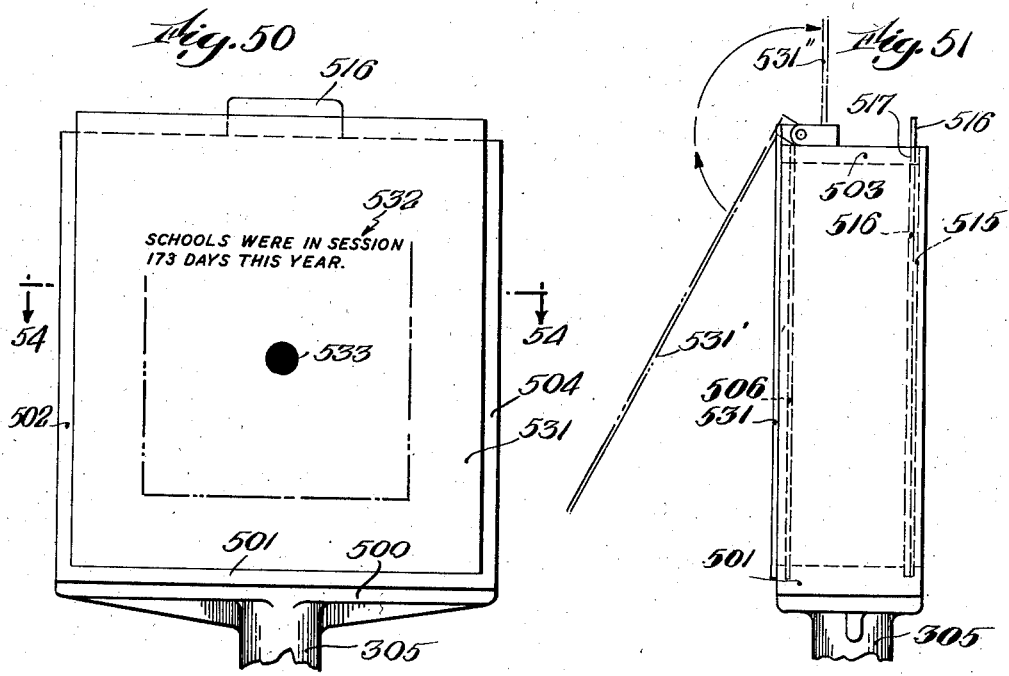
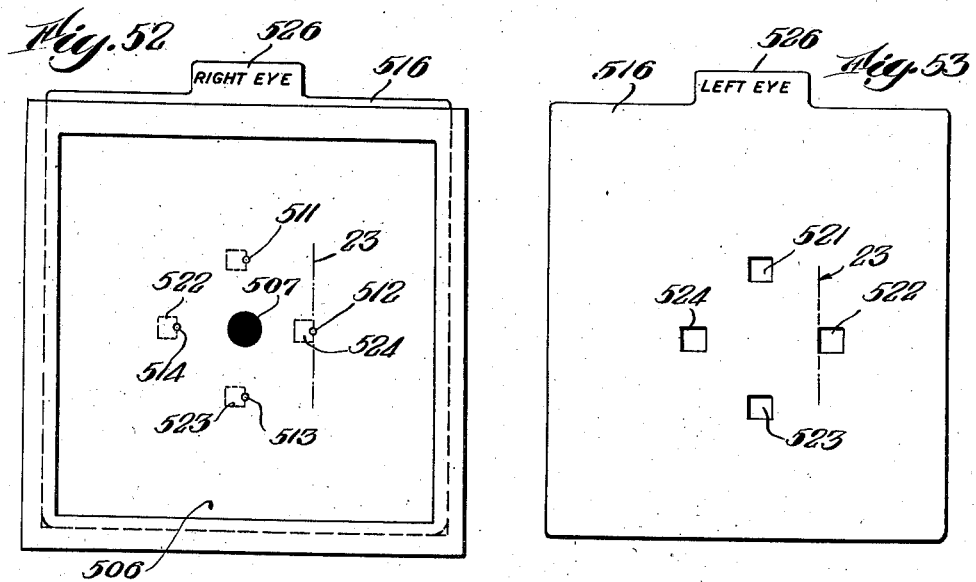
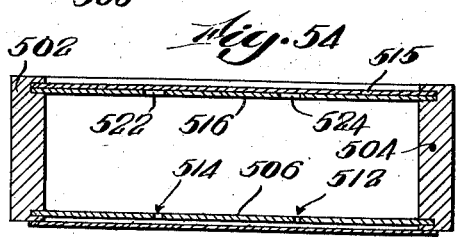

Oct. 12, 1937.   A. AMES, JR   2,095,235
METHOD AND INSTRUMENT FOR TESTING EYES
Filed Jan. 13, 1934    16 Sheets-Sheet 14
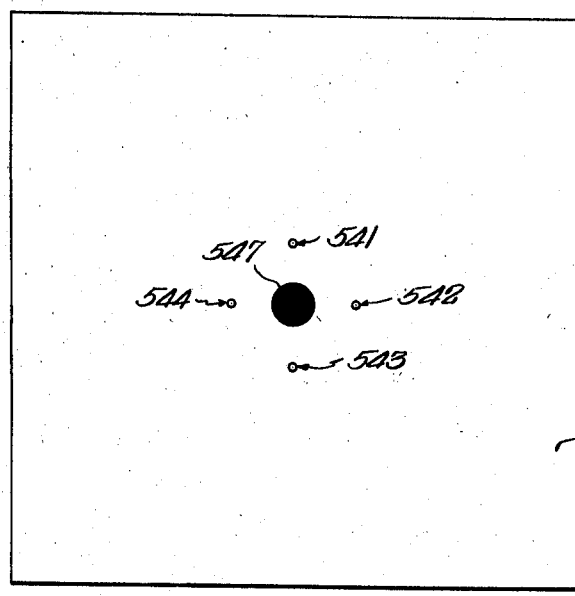
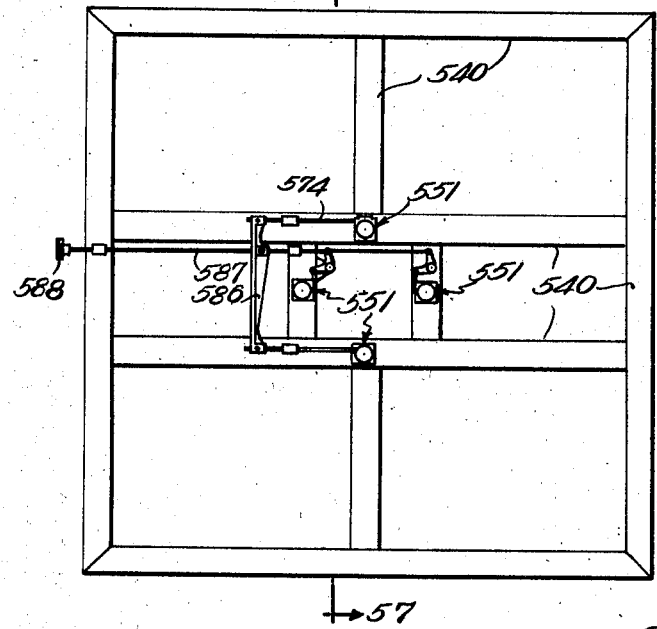
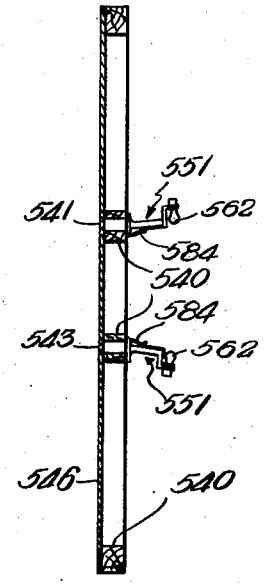

Oct. 12, 1937.  A. AMES, JR  2,095,235
METHOD AND INSTRUMENT FOR TESTING EYES
Filed Jan. 13, 1934  16 Sheets-Sheet 15
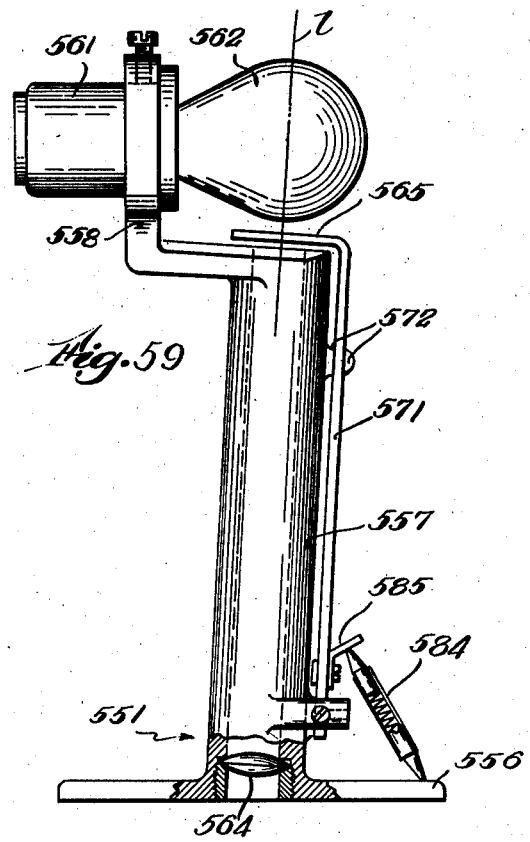
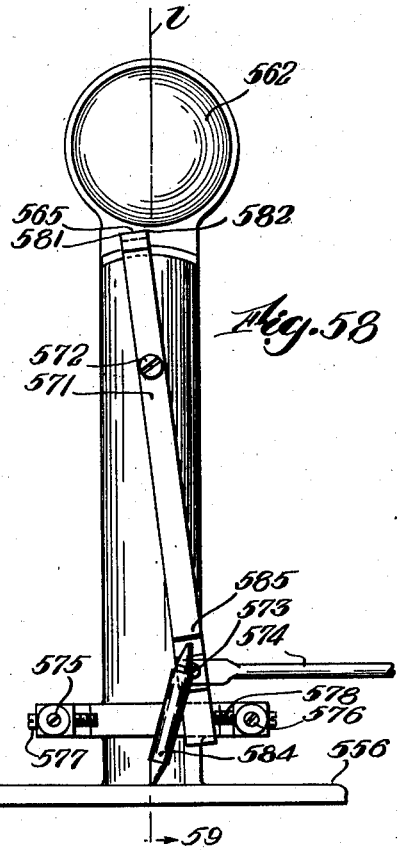
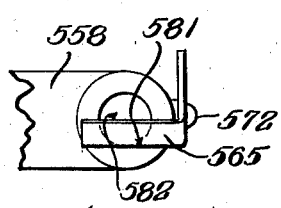
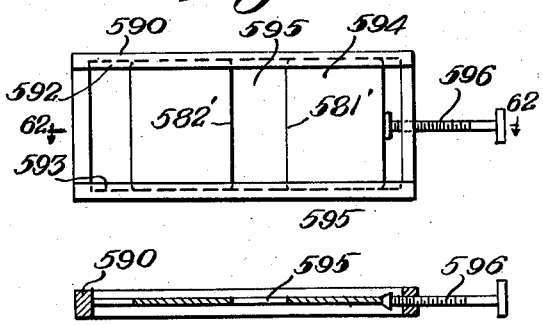

Oct. 12, 1937.  A. AMES, JR  2,095,235
METHOD AND INSTRUMENT FOR TESTING EYES
Filed Jan. 13, 1934  16 Sheets-Sheet 16

Patented Oct. 12, 1937

2,095,235

UNITED STATES PATENT OFFICE 2,095,235

METHOD AND INSTRUMENT FOR TESTING EYES

Adelbert Ames, Jr., Hanover, N. H., assignor to Trustees of Dartmouth College, Hanover, N. H., a corporation of New Hampshire Application January 13, 1934, Serial No. 706,523

50 Claims. (Cl. 88—20)

The present invention deals with methods for testing eyes and instruments for carrying out these methods, and more particularly with the examination of the eyes for refractory defects, phorias, and conditions involving ocular image differences, separately as well as especially with a view to the interdependency and relationship of these deficiencies of the apparatus of visual perception.

The refractory and muscular defects of the eyes are well known, whereas the more recently investigated image difference defects are discussed, for example, in Patents Nos. 1,933,578 of November 7, 1933 and 1,944,871 of January 30, 1934, and also in various publications, for example, in the Journal of the Optical Society of America, volume 22, page 538. Therefore, it will be sufficient to recapitulate that these image difference defects are caused by discrepancies of the ocular images which are sometimes also referred to as retinal images, these terms being used to describe the impression formed in the higher brain centers through the vision of one eye. These ocular images are determined not only by the properties of the dioptric image that is formed on the retina of the eye but also by modifications caused by anatomical properties and physiological conditions influencing the transmission of this optical image to these brain centers.

The two ocular images of a pair of eyes may differ in size at the same ratio in all directions (over all size differences) or they may so differ in one direction only (meridional size differences) or they may differ irregularly (asymmetric size differences, or shape differences). All these differences of the ocular images will be herein shortly referred to as "image differences", unless it is specifically stated that only one of these several types of defects, which may be coexistent, is discussed in any particular instance. Such defects do not only cause great inconvenience but may be the underlying cause of quite serious visual, nervous, and other disturbances. Eyeglasses for relieving such defects are described and claimed in the above-mentioned application Patent No. 1,933,578, and methods and instruments for examining patients for the purpose of prescribing glasses for all corrigible ocular defects, including image differences, are described in Patent No. 1,944,871.

Conditions which have to do with the size and shape of ocular images are also characterized by the term "eikonic". The condition in which size and shape of the ocular images are equal is called "iseikonia", whereas the condition in which size or shape are unequal is termed "aniseikonia", which as above discussed, may be overall or meridional.

It was found that the prior methods and devices for examining eyes for such defects, although quite effective within their scope, are for certain purposes not sufficiently exact, convenient and adaptable to varying conditions. For example, the devices for directly measuring the refractory characteristics of the eyes simultaneously with the other above-mentioned defects, are not as exact as they might be, for measuring ordinary as well as astigmatic focal lengths. Also, the indirectly viewed targets, separate for each eye, for evaluating image differences and phorias are not absolutely satisfactory. A precise combination, and cooperation of these optically superimposed target units with the other testing elements of the instrument is difficult. Especially the unavoidable slight inaccuracies in mechanical details, differences due to heat expansion and contraction, and other causes of slight dimensional variations of the two separate targets causes difficulties since, in order exactly to evaluate the image differences, the test objects presented to each eye must be exactly of the same dimension, and positioned very exactly relative to each other and to the other elements of the instrument.

Therefore, some of the main objects of the present invention are to provide simplified and more exact methods and devices for determining refractory, muscular and image difference defects of the eyes; to provide a method for evaluating image differences which is inherently absolutely accurate and reliable, and test objects or targets of simple, convenient and inexpensive construction for carrying out the new method; to provide methods and means for accurately and conveniently measuring refractory defects of the eyes with an instrument of the type herein referred to; and generally to provide methods, and accurate and yet simple and easily operable instruments for testing eyes for all corrigible defects, including refractory, muscular and size difference faults thereof, whereby, further, the eyes can be tested by accurately reproducing the conditions under which they are actually used in everyday life.

In one aspect, the invention involves, as already mentioned, methods which are inherently accurate for testing image difference and phoria defects and are independent of the mechanical imperfections of test means separately presented to each eye. This object is attained, according to the present invention, by introducing a single element, located in the direct line of vision (that is a line of vision which is not broken or deviated, for example by prisms or mirrors, disregarding, however, the effect of test elements inserted before the eyes), which presents to each eye the appearance of an object, design, or detail, whose character is rendered non-fusibly different or dissimilar for each eye by suitable means, whereas the spatial arrangement or distribution of the detail is only determined by the directly viewed single element. This single test element is used with an object or objects determining the vergence of the eyes, also referred to as fixation means or fixation mark. According to the present invention, the fixation means is preferably a single, fusible object presented in fixed spatial relationship with the means for determining the uniform spatial arrangement of the non-fusible detail.

Since the presentation of the detail is brought about by a single element, it is evident that the detail must necessarily appear to the eyes as similarly located in space. Its dissimilarity in character may be obtained in various ways as, for example, by making it of different light intensity, or of different colors, as will be described hereinafter. Due to their peculiar nature, the devices for carrying out the new method for testing image differences (herein referred to for short as "size targets", although they permit the evaluation of all above-mentioned size or shape defects, or all types of fixation disparities, or of any of these defects in combination) can be easily combined with means for testing other eye deficiencies in a manner not possible with the previously described instruments having a distinct image magnitude target for each eye. It is especially possible to combine the new targets with either directly or indirectly viewed apparatus for dioptric tests. They also permit the convenient testing of image differences for comparatively great viewing distances, the use of several, or the same, targets for different inclinations of the line of vision, but also the use of a single target for different distances and therefore convergencies, and for different inclinations of the line of vision.

Another object of the invention, made possible by the new method of image difference testing, is to provide a simple way of changing the dissimilar characteristics of the non-fusible object appearances presented to the respective eyes, from one eye to the other, without changing the spatial arrangement of the appearances. This object can be accomplished according to the new method, because it employs separate instrumentalities for determining the similar spatial arrangement with respect to a fixation means, and for determining the dissimilar character, respectively, of the appearances.

Another feature of the invention is a new method, and various devices for carrying this method into practice, for determining points conjugate to the retina, that is, the focal length of an eye, for any desired vergence of the eyes. This method utilizes focusing objects not conveying the impression of space as, for example, spheres or, as the case may be, point, star, or linear lights, and permits accurate adjustment of these objects into the conjugate distance and, further, accurate and convenient determination of astigmatic meridian and astigmatic interval.

A further feature of the invention is the promotion of refractory tests by making a test object always appear of the same size, no matter what its distance from the eye may be, thereby not only eliminating certain impressions of space, but also optically changing the distance between eye and test object, and making possible the use of especially convenient scales for measuring focal distances.

In another aspect, the new instrument permits accurate tests by providing a head positioning device that permits universally reproducible positioning of the head in a convenient and exact manner.

Still another object of the invention is to provide a simple but exact and efficient method for investigating phorias, and means for carrying out this method.

Instruments according to the invention also include features whose objects are to provide exact and convenient means for correctly positioning the eyes relatively to the instrument, in which position they can then be fixed with the above-mentioned head positioning instrumentalities; and to provide means for tilting certain elements of the instrument.

In one embodiment of the invention which will be described herein in detail, a single size target is combined with a single focusing object which, according to the invention, can be virtually positioned in various distances relatively to the target, this embodiment being especially suitable where compactness of the instrument is desired. This embodiment also introduces features whose objects are to provide means for measuring the refractive condition of each eye, at a fixed vergence of the eyes, with a single focusing object, and to provide means which eliminate from one eye the vision of the focusing object seen by the other eye without introducing any irritating or confusing appearances.

Another embodiment according to the invention, also to be described in detail, combines several size targets with indirectly viewed focusing objects, which arrangement permits especially exact and complete measurements. This embodiment includes novel means providing for conveniently and accurately tilting a portion of the instrument, and means for quickly and accurately adjusting the refractory test means or focusing objects for different pupillary distances and vergence angles of the eyes.

In still another aspect, the new method and the new devices for its execution provide for the concomitant evaluation of dioptric, muscular and image difference defects, and their interdependency and correlation, by continuously maintaining binocular vision approximating the conditions under which the patient is accustomed to use his eyes. This feature is especially important since it was found that these defects are so closely interrelated that a satisfactory examination and correction of the eyes is only possible by continuously checking the mutual influence of these ocular conditions and of the means for correcting them, thereby maintaining binocular vision as determined by a certain vergence of the eyes.

This and other objects, aspects and features of the invention will become apparent from the following detailed explanation illustrating the genus of the invention with reference to several concrete embodiments thereof. The description refers to drawings, in which Fig. 1 is a diagram illustrating the general principles of the invention;

Figs. 2, 3, and 4 are diagrammatic plans of size targets according to the invention;

Fig. 5 is a diagrammatical side elevation of a size target arrangement for near and distant vision;

Figs. 6, 7, 8, and 9 are diagrammatical views of various modifications of a focusing device according to the present invention;

Fig. 10 is a diagram illustrating the function of a device according to Figs. 6 to 9, inclusive;

Fig. 11 is a diagram explaining the investigation of astigmatism with the aid of a device according to Figs. 6 to 9, inclusive;

Fig. 12 is a front elevation of a focusing device according to Fig. 9;

Fig. 13 is a section on line 13—13 of Fig. 12;

Figs. 14 and 15 are a diagrammatical front elevation and a plan, respectively, of a multiple focusing object;

Fig. 16 is a view similar to Fig. 14 but with the astigmatic images aligned;

Fig. 17 is the front elevation of a focusing device constructed according to Figs. 14 to 16, with the lower portion of the slider omitted;

Fig. 18 is a section on line 18—18 of Fig. 17;

Fig. 19 is a section on line 19—19 of Fig. 18;

Fig. 20 is a front elevation of a focusing device with selectively adjustable testing object;

Fig. 21 is a section on line 21—21 of Fig. 20;

Fig. 22 is a section on line 22—22 of Fig. 21;

Fig. 23 is a front elevation similar to Fig. 20, but with the cover plate removed;

Fig. 24 is a section on line 24—24 of Fig. 23;

Fig. 25 is a diagram illustrating the operation of an auxiliary lens for use with focusing devices according to the invention;

Fig. 26 is an isometric view of one embodiment of an instrument for carrying out the eye testing method according to the invention;

Fig. 27 is a view of the front side of the test slide shown in Fig. 26;

Fig. 28 is a similar view of the back side of the slide shown in Fig. 27;

Fig. 29 is a diagrammatic plan view of the instrument shown in Fig. 26;

Fig. 30 is a front elevation of the size target according to Fig. 29 as it appears to the left eye;

Fig. 31 is a similar view of the target as it appears to the right eye;

Fig. 32 is a front view of the refractive test chart shown in Fig. 26;

Fig. 33 is a side elevation of another embodiment of an instrument for carrying out the eye testing method according to the invention;

Fig. 34 is a front elevation of the instrument shown in Fig. 33;

Fig. 35 is a plan view of the instrument, shown in Fig. 33;

Fig. 36 is a plan view of part of the head rest structure shown in Figs. 33 and 34;

Fig. 37 is a plan view of the head rest slide shown in Figs. 33 and 34;

Fig. 38 is a plan view of the head rest bed shown in Figs. 33 and 34, with the slide removed;

Fig. 39 is a bottom view of the slide shown in Fig. 37;

Fig. 40 is a section through the head rest mechanism, on line 40—40 of Fig. 39;

Fig. 41 is a section on line 41—41 of Fig. 39;

Fig. 42 is a section on line 42—42 of Fig. 33;

Fig. 43 is a section through the head rest column on line 43—43 of Fig. 40;

Fig. 44 is a similar section on line 44—44 of Fig. 40;

Fig. 45 is a front view of the instrument foot shown in Figs. 33 and 34;

Fig. 46 is a front view of the bridge structure of Figs. 33 and 34, shown in alignment with the instrument foot of Fig. 45;

Fig. 47 is a section on line 47—47 of Fig. 34, showing the construction of the instrument bridge;

Fig. 48 is a diagram illustrating the manner in which the bridge structure is moved;

Fig. 49 is a section on line 49—49 of Fig. 35;

Fig. 50 is a front elevation of the size target shown in Figs. 33 and 34 with the test chart in place;

Fig. 51 is a side elevation of the same target;

Fig. 52 is a view similar to Fig. 50 with the chart removed;

Fig. 53 is a view of the screen shown in Figs. 50 and 51;

Fig. 54 is a section on line 54—54 of Fig. 50;

Fig. 55 is a front view of a large size target according to the invention;

Fig. 56 is a back view of the target according to Fig. 55;

Fig. 57 is a section on line 57—57 of Fig. 56;

Fig. 58 is a front elevation of one of the tubular structures shown in Figs. 56 and 57;

Fig. 59 is a side elevation, with the foot in section, on lines 59—59 of Fig. 58, of the tubular structures according to Fig. 58;

Fig. 60 is a plan of the shutter structure shown in Figs. 58 and 59;

Fig. 61 is an elevation of a screen structure forming a modification of the shutter shown in Fig. 60;

Fig. 62 is a section on line 62—62 of Fig. 61;

Fig. 63 is a wiring diagram of the illumination equipment of the instrument shown in Figs. 33 and 34;

Figure 64:
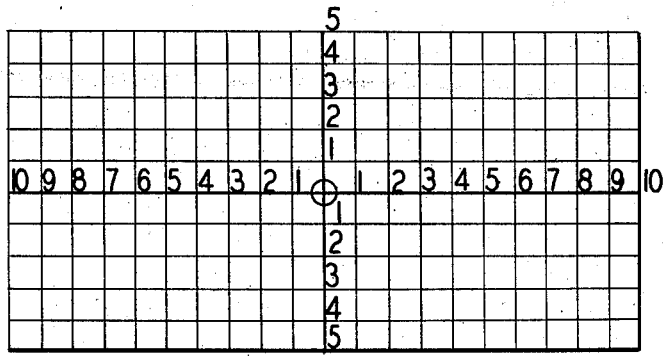
Fig. 64 shows a chart used for determining phorias.

The principles underlying the method and the instruments according to the invention will first be explained by referring to Fig. 1. In this figure, OD and OS are the right eye and the left eye, respectively, with centers of rotation CD and CS, respectively, which points are connected by horizontal axis of rotation $h$. In order to simplify the diagrammatical Fig. 1, the light rays are drawn as if the nodal points of the eyes coincided with the centers of rotation, whereas actually the nodal points are, as well known, a certain distance in front of the centers of rotation. C is a point midway between the eyes, from which a horizontal line $c$, referred to as normal line of vision, leads to a point F at which the eyes are looking in horizontal direction. F will be referred to as fixation point. The lines $s$ and $d$ from the eyes to the fixation point F are the visual axes of the eyes, and the angle $\gamma$ which they subtend at F is a measure of the convergency of the eyes.

While it may be assumed that these axes are approximately horizontal when the person in question is looking straight ahead at infinite distances (to which a distance of approximately 6 m. is substantially equivalent), they are inclined when the person reads or does other work at close distance, the head being assumed to remain in the same position. It was found that an inclination of the visual axes of about 20° to the horizontal direction, with the position of the head the same as for distant vision, and a convergence of the eyes to a point about 40 cm. from their centers of rotation approximately reproduces this condition of near work, which is indicated in Fig.

1 by inclined line of vision $b$, angle $\delta=20°$ and inclined visual axes $t$ and $e$ converging towards fixation point E.

The fixation point F may be provided directly by an object or fixation mark, as for example a dot, ring, letter, or cross painted on a screen in plane A, or indirectly by adjusting indirectly viewed test objects in such a manner that the appropriate line of vision of each eye is established by the virtual image of a test object. For example, a semi-transparent mirror M may provide in axis $s$ an image of object O, and a similar mirror an image of a second object in axis $d$, which arrangement causes the eyes to converge at F, as at length described in patent No. 1,946,925 of February 13, 1934. Similarly, mirrors represented by reflector N, and objects represented by Q, may be provided for each eye, causing the appearance of fixation point E on a plane K perpendicular to inclined line of vision $b$.

For purposes of the present invention which utilizes the already mentioned novel method of testing image differences, it is preferable to establish convergence with a fixation object viewed directly by both eyes. Such a single object can be definitely correlated with the single element determining the spatial arrangement of the size target detail, which arrangement assures inherently exact and unchangeable distancing of fixation mark and size target detail. It is, however, understood that either mode of establishing convergence may be employed.

It will be evident that fixation points at various locations (preferably for distance and near vision as above defined) can be obtained either by providing several directly viewed fixation marks or by optically moving a fixation mark by inserting the proper optical means, as prisms and lenses, between eye and mark, or by appropriately changing the position of mirror and indirectly viewed objects.

For measuring refractory defects, test objects (herein referred to as "focusing objects") are provided, which permit the determination of a point conjugate to the retina of the eye, when the eyes are at a certain vergence. Such focusing objects are preferably of a type, to be described in detail hereinafter, that permits exact determination of their coincidence with the conjugate points, and in addition the determination of astigmatic meridian and astigmatic interval. In order to permit refractory investigations at various positions of the fixation point, focusing objects like O and Q of Fig. 1 may be viewed indirectly through transparent mirrors as M and N, and moved along tracks $m$ and $n$. These tracks should be adjustable, with their mirrors, for different positions of axes $s$ and $d$, about vertical axes $v$ and $w$ through centers of rotation CS and CD, respectively.

Instead of indirectly viewed focusing objects like O and Q, such objects may be provided in the direct line of vision of an eye, as indicated at P and R. If such directly viewed focusing objects are used, the vergence of the eyes must be fixed with the aid of indirectly viewed means, or, as a preferred embodiment according to the present invention, a directly viewed fixation mark must permit observation of the focusing object. If one directly viewed focusing object is used for both eyes, it must be arranged to be rotatable about the fixation point, as will be evident from Fig. 1 where P is in the axis of the eye OD, and R in the axis of the eye OS. For various positions of the fixation point, either separate focusing objects can be provided, or one object can be differently positioned either actually or virtually by appropriate optical means. Practical means accomplishing these functions will be described hereinafter.

Lenses for optically placing the various test objects at different distances may be inserted at the appropriate points, as for example indicated at G, G' and G'' of Fig. 1. According to the invention, such lenses may have the further function of making the apparent size of test objects approximately constant and of permitting the convenient reading of distances in diopters from the nodal points, as will be explained in detail hereinafter.

Optical means, as conventional power lenses, prisms, or size changing lenses can be inserted in front of each eye, as indicated in Fig. 1, where, for example, 16 and 17 may be power lenses correcting overall and astigmatic refractory defects, or prismatic glasses, or both, and where 18 and 19 may be lens sets for continuously changing the overall or meridional image size, or both, according to copending application Serial No. 713,701 filed March 2, 1934, or lenses from test sets of size lenses, for example according to copending application Serial No. 749,948, filed October 25, 1934.

Arrangements of this type are also inherently adapted for the performance of tests concerning the muscular defects known as phoria, and the so-called fusional amplitudes, as will be explained more in detail hereinafter.

In order successfully to carry out investigations of this character, it is necessary rigidly to position the eyes and the head not only during one test, but reproducibly for subsequent tests, and to adjust the instrument to fit the eyes of each particular patient. To this end, the distance between vertical axes $v$ and $w$ is adjustable for different pupillary distances, and means are provided to position the eyes so that their centers of rotation are actually located at the intersections of axes $h$, $v$ and $w$, such means to be described in detail hereinafter. In order to assure measurable and exactly reproducible positioning of the eyes, a structure supporting the head at three points 10, 11, 12 is provided, this head rest being universally adjustable by linear movement along three axes 7, 8, 9 and rotatory movement about these axes, as indicated by arrows. Six scales for measuring these movements may be provided, as incorporated in one of the embodiments to be described hereinafter.

The size of an object observed by the patient may be expressed by the angles which rays coming from certain points thereof subtend at the eyes, as for example angle $\beta$ (Fig. 1) between lines from CD to F and point 2 on plane A, respectively. In order to determine image differences of the eyes according to the new method according to my invention, the eyes are caused to observe a means presenting to each eye the appearance of detail arranged in a certain manner relatively to its perception by each eye separately, and to a fixation point for both eyes. This means may, for example, be a shield in plane A with small practically point-like portions 1, 2, 3, 4, which of course, forming one single pattern or detail, appear to both eyes similarly spaced, but to which is by some means imparted a character different for each eye. Fig. 1 shows by way of example one method of accomplishing this result, and various structures for carrying out this method will be described in detail hereinafter, as incorporated in practical testing instruments. In principle, these embodiments present to the eyes a shield A with several small perforations 1, 2, 3, 4, through which the eyes are able to look as indicated by the rays reaching CD and CS from points 1, 2, 3, and 4. Observing, for example, perforation 2, it is evident that eyes OD and OS look at different points 21 and 22, respectively, in a plane B behind shield A. If, in some manner, points 21 and 22, (or rather the areas at the right and left of the vertical dividing line 23 drawn at the intersection with plane B of a line r from C through 2) are made of different character, each eye sees an object, or detail, in the present instance perforations 1, 2, 3, and 4 symmetrically arranged around fixation point F, as of different character, but of exactly the same spatial arrangement as that seen by the other eye. If for example, the areas at the left of 23 and the corresponding dividing lines for the three other perforations are made of light absorbing material, whereas the areas to the right of the dividing lines are emitting light, for example because made of translucent material with a light source behind, the right eye OD see points 1, 2, 3, 4 as four dark spots around F, and the left eye OS sees them as four bright stars similarly arranged around F. Whereas a preferred design or pattern consisting of four symmetrically arranged points in the vertical and horizontal axes is shown in Fig. 1, it is understood that for certain purposes a single point, or openings in any desired distribution, and of any shape other than small circular openings may be utilized. More particularly, four additional points in the 45° and 135° meridians are often desirable, at the same distance from the center as the points in the vertical and horizontal meridians. The embodiment of this invention shown in Figs. 26 and 29 has a shield of this type. For tests with the eyes not looking straight ahead, the shield A should be placed perpendicularly to the line of vision, as indicated in Fig. 1, where K is the plane of a shield for tests with the eyes looking down as in reading. Two perforations 5 and 6 at either side of fixation mark E are shown, and 27 indicates the dividing line between areas of different character, seen by the right and left eye, respectively.

Since it is very important to exclude during tests involving binocular vision, as in the tests for image differences herein contemplated, every extraneous influence including binocular depth perception or fusion of objects other than those whose fusion is intended, means are provided for removing any such influence that might originate in the structure of the targets, shields, and similar elements. Such means are indicated at 25 and 26 of Fig. 1 in the form of masks covering the entire field of vision of each eye, excepting a central portion large enough to permit observation of the test objects in question. This central opening is of different shape for each eye, for example square for OS and circular for OD. These screens prevent fusion of the edges of the size target if their openings are of such size that the edges of the target cannot be seen by either eye, and therefore exclude any fusion that might be induced by the target structure. In order not to impair binocular vision, the areas of the mask openings should be equal, so that like amounts of light flux will pass therethrough.

Several possibilities of carrying out the new method of testing eyes for image differences, whose general principle has been discussed by referring to Fig. 1, will now be described.

In Fig. 1, if the areas to the left of the boundaries corresponding to dividing lines 23 are made of translucent material with a light source behind, and the areas to the right of these boundaries are made opaque, the eyes see an identical fixation mark or fusion object represented by F, and equally disposed non-similar objects or details which do not fuse, namely, a pattern of bright stars and one of dark spots, respectively. As shown in Fig. 2, there may be a shield A, again with perforations represented at 2 and 4 and a back screen B with openings 31 and 32 and opaque shutters 33, 34 leaving about one-half of each opening unobstructed. Therefore, lamps 35 and 36 can be seen by eye OS directly through perforations 2 and 4, whereas eye OD sees the shutters as dark spots. In order to supply the necessary contrast, shield A should be illuminated to an intermediate brightness permitting the patient to distinguish the bright spots as well as the dark points. A lamp 37 with reflector 38, the light intensity of the lamp being adjustable by means of a resistor or other suitable device, may be arranged for this purpose. This lamp also provides illumination permitting observation of fixation mark F indicated in Fig. 2 by a heavier line.

The light intensity of lamps 35 and 36, or of light sources having a similar function, should also be controllable since, if the light spots are too bright, they scintillate and do not appear to have a definite and compact form. On the other hand, if their intensity is too low, they cannot be distinctly perceived.

Since the openings 2, 4 must necessarily have a finite diameter, it is evident that any object located behind an opening and between plane i (parallel to shield A) and shield A within the space defined by the opening and the intersection of rays 20 and 30, could be seen by both eyes. It is, therefore, necessary to place the dissimilar objects behind plane i. This circumstance is of importance when targets are used at comparatively great distances, where the distance between A and i may become inconveniently large. In this case it may be necessary to increase the distance between A and B optically, by means of lenses placed near the openings 2, 4. The structure of such an embodiment will be described hereinafter more in detail.

Instead of using various degrees of light intensity to differentiate the dissimilar objects, other characteristics may be employed for this purpose, as for example different colors. In Fig. 3, numerals 41, 42, and 43, 44 are filters transmitting light of different colors, for example, red and green, respectively, and suitably illuminated, as by lamps 46 and 47. It will be evident from Fig. 3 without further explanation that the right eye sees red spots, and the left eye green spots spaced exactly alike relative to fixation mark F.

Still another modification is illustrated in Fig. 4, where 51 and 52 are filters each transmitting light to two distinct wave length ranges, as for example of approximately 500 $\mu$ and 700 $\mu$ (Wratten filter #77A), the light being supplied by lamps 56 and 57, whereas 53 and 54 are filters which transmit only light of different ones of the two ranges transmitted by filters 51 and 52. For example, if 53 transmits only green light and 54 only red light, the right eye again sees only red spots, and the left eye only green spots, both groups of spots being spaced exactly as openings 1, 2, 3, 4.

If targets at different distances (for example, reading distance of 40 cm. and infinite distance corresponding to 6 m.) are used with one instrument, the openings and the fixation mark of the further target should have sizes and distances increased in proportion to the greater distance of that target from the eyes, so that they subtend the same angle at the eyes as the corresponding elements of the near target and therefore appear on the same angular size, and are at the same angular distance from the fixation mark as the holes of the near target. These relations are shown in Fig. 5, where A and K are a near and a distant shield, as shown in Fig. 1, where $\delta$ is the angle of inclination of the near target and where $\alpha$, $\epsilon$ and $\zeta$ are the angles characteristic of the relation between fixation marks and openings, opening diameter, and fixation mark size, respectively.

In certain cases it becomes desirable to shift the character of the target appearances from one eye to the other. For example, if one eye is especially weak, it may be better to allot to it the bright instead of the dark spots, and the instrument is, therefore, adapted for adjustment to varying demands of this nature, according to the requirements of the patient to be examined. For example, in order to change in Fig. 2 the bright spots from the left eye to the right eye, it is merely necessary to shift shutters 33 and 34 in such a manner that they cover the sectors heretofore left transparent, that is, they must be shifted in the directions of arrows 39 until the left edge occupies the former position of the right edge of each shutter. Practical constructions for carrying out this adjustment will be described hereinafter.

Some of the advantages of the method involving the use of a single size target, over presenting separate objects to each eye, as described in Patent No. 1,944,871, have been mentioned before, namely, the absence of any necessity of very accurate adjustment as well as the absence of the possibility of differences in the spatial arrangement of the detail in spite of the most exact adjustment. As will now be evident, there is in addition the fact that two indirectly fused targets do not give exactly the same impression as a single target. As indicated in Fig. 2, separate targets $x$ and $y$ give virtual images $x'$ and $y'$ which subtend slightly different angles to the line of vision $c$. This fact results in a visual effect different from actual binocular vision, whereas the single real image of the direct vision target conforms to actually existing conditions.

It will be evident that my new unitary target permits, like the older instrument with two separate targets, the presentation to both eyes of exactly the same appearance, that is with detail of the same character, for example by extinguishing the lamps behind screen B with, or without removing the fixation object, so that both eyes see dark dots. In this manner, certain tests involving amplitude values of binocular vision could be carried out by changing ocular image sizes with the aid of trial lenses, which tests, however, give only rather approximate results.

In the earlier type of instrument for determining the refraction of an eye, that is, the point conjugate to the retina when the eye has a certain convergence fixation, (as for example in the instruments described in Patents Nos. 1,946,925 and 1,944,871); a single test object or test letter is moved towards and away from the eye under test, and its position determined when it can be seen most sharply and clearly. Such objects can be used for carrying out the test methods according to the present invention, and an improved and novel focusing device of this type will be described as part of one of the instruments according to the present invention.

However, while such focusing objects work well in general, more sensitive focus measuring methods and means are desirable in conjunction with the extremely sensitive image difference tests as herein disclosed. These methods are based on the use of several similar small light-emitting objects, as indirectly illuminated balls, test letters, or illuminated pin-holes arranged in the peculiar manner now to be described.

In one modification, two small and exactly similar test letters or points emitting light are employed which are arranged at a certain interval, preferably about 1.5 diopters apart substantially along the line of vision, their projections along this line being only separated so far as necessary as to permit separate perception of the two objects. The separation of two points of light along the line of sight can be obtained by various means, some of which will now be explained.

The arrangement according to Fig. 6 has an opaque screen or housing 61 with a wall 62 substantially parallel to the line of sight (for example, $d$ of Fig. 1) and two walls 63 and 64 substantially normal thereto and having perforations 65 and 66 close to the partition 62. A lamp 67 behind an opal glass 68 illuminates the two perforations which therefore appear to the eye OD as two star points very close together at either side of the line of vision $d$ and separated by the distance between perforations 65 and 66 along line $d$, as indicated by light rays 69 and 70.

The arrangement according to Fig. 7 has an opaque mirror screen 71 with a reflecting surface and a pinhole 72 illuminated by lamp 73 behind opal glass 74. Pinhole 72 is directly visible along line of sight $d$, as indicated by ray 75. The light point represented by pinhole 72 is also reflected by mirror 76 and the reflecting surface of screen 71, as indicated by ray 77. Again, the eye perceives two separate points of light very close to the line of sight, which points are virtually separated by twice the distance of surfaces 71 and 76.

The arrangement according to Fig. 8 has two prisms 81 and 82, and a screen 83 with pinhole 84 illuminated by lamp 85. Screen and prism are so arranged that pinhole 84 is directly visible, as indicated by ray 86, but also reflected, as indicated by ray 87. The faces of the prisms are so displaced that distance 88—88' between the two branches 87' or ray 87 is somewhat shorter than distance 89—89' cut off along ray 86 by the faces of prism 81. Hence, the eye OD perceives two separate light points close to line of sight $d$, virtually separated by twice the distances between the reflecting surfaces of prisms 81 and 82, that is, path 89—88—88'—89'.

The arrangement according to Fig. 9 has a small light-reflecting object, for example a ball 91, illuminated with parallel light coming from a lamp 92 behind condenser lens 93, and a mirror 94 whose plane is slightly displaced from the position normal to line of sight $d$. The mirror 94 reflects the light coming from ball 91, forming a virtual image thereof at 95 which is perceived by eye OD as indicated by ray 96, whereas the ball 91 itself is seen along ray 97. The light apparently coming from 95 travels a path which is the distance 91—95 longer than that traveled by the light coming directly from ball 91. Again, the eye perceives two separate light points close to the line of sight, and virtually separated along the line of sight twice the distance between ball 91 and mirror 94.

Focusing devices of this type are preferably designed for an apparent distance of the two exactly similar test objects of about 1.5 diopters, which distance corresponds, for example, to an actual separation of the two objects of about 6 mm. along the line of sight if, as in a preferred embodiment to be discussed hereinafter, a lens of +5.00 diopters is used between the eye and the target.

For determining the point conjugate to the retina at a given vergence fixation, the focusing device is moved back and forth until both images have the same size, although each is very lightly out of focus. This type of setting has the advantage of being a direct comparison setting. If a single test object is used and set for sharpest or smallest appearance, by moving it along one of axes $m$, $n$, $s$, $d$, $t$, or $e$ of Fig. 1, it is so moved that the letter, or whatever the test object may be, is first blurred, then becomes sharper, quite sharp, and again blurred. It is difficult to tell just when it is sharpest, the only criterion being the memory of its sharpest appearance without any assistance of present comparison. There is, therefore, a tendency to move the target a little further to make it appear sharper, whence it starts blurring again.

Focusing objects according to the present invention have the advantage of permitting a direct comparison setting. Although other objects, as letters, could be used with this type of focusing device, star points of light as provided by illuminated pinholes or by small reflecting objects of curved cross-section are preferable, and the focusing devices are moved until the two points of light are just the same size. If the device is moved slightly, one point of light becomes smaller and the other larger, always assuming that the conjugate point has been placed between the two objects by way of preliminary adjustment.

A further advantage of this arrangement is based on the fact that it takes less movement to change the size of a slightly diffused image of a star point than that of a sharp image. The reason for this is the shape of the image caustic formed in the eye. As schematically illustrated in Fig. 10, the caustic 99 formed by the eye lens 100 behind cornea 101 has a rather slender waist on both sides of the retina 102, this waist having approximately the same diameter for some length, as for example from 103 to 104, from where it begins to flare out relatively quickly towards 105 and 106. If the caustic is carried backward and forward through the retina by correspondingly moving the light source whence its rays originate, the apparent size of the light source appears to change much more rapidly as the sections 105—103 and 104—106 pass through the retina, than for the similar movement of section 103—104. Hence, it is much easier to observe the size change of images formed by the flaring portions of the caustic, and likewise to adjust the focusing device so that the images, which may for example be separated by distance 105—106, appear as of equal size, as indicated at 107 and 108, whereas 109 symbolizes the smaller and sharper, but slowly changing image formed near the waist of the caustic.

In evaluating the focal distance, that is, the distance from the eye to the point in space that is conjugate to the retina, it must be considered that this point is midway between the two images appearing of equal size, as for example point 60 of Fig. 6, or point 90 of Fig. 9. The scale and indices of the instrument must be placed accordingly, as will be explained more in detail when describing practical embodiments of such devices as incorporated in eye-testing instruments.

Referring to Figs. 12 and 13, a specific embodiment of the arrangement according to Fig. 9 will now be described as an example of the practical design of such devices. In these figures, 481 is the element for guiding the focusing device along axes $s$, $d$, $m$, or $n$, as for example the side arms of the instrument depicted in Figs. 33 to 35. A slider casting 141 has a base plate 142, two guide flanges 143, 144, two lamp housing sides 145, 146, and a back wall 147. Springs 148 and 149 are fastened to flanges 143 and 144 by means of a filler block 151, these springs pressing the slider base plate 142 against arm 481, thereby providing proper contact between arm and slider. Guide flange 143 has a window displaying the scale 483 of the arm, and two indicators 152, 153 placed in a manner presently to be described.

Lamp housing wall 145 has a hole through which extends a rod 154 bearing at its inner end a ball 91 of perfect spherical surface, preferably a bearing ball for example of $\frac{1}{16}''$ diameter, chromium plated, and soldered to rod 154 whose diameter should be slightly less than the diameter of the ball. The length of the inside portion of rod 154 may be adjustable, for example by a threaded portion 156 and nut 157. The side wall 146 opposite ball 91 has an opening with a condenser lens 93, and fastened to guide flange 144 is a lamp socket 162 supporting a small lamp 92 supplied through electrical leads 164 and 165. Lens 93 and lamp 92 are so placed that the focal point of the lens is approximately at the lamp filament, so that the rays falling from the lens onto the ball are substantially parallel. It should further be observed that the supporting rod 154 is in the shadow of the ball and therefore not illuminated, and that the center of the ball is in the line of sight, with the latter passing halfway between its center and its outermost point, as indicated in Fig. 9. The optical axis of lens 93 should be aligned with rod 154. The lamp 92 can be so adjusted that the filament is aligned with lens 93 and rod 154.

Lamp housing back wall 147 supports a mirror 94 by means of springs 166, 167, and 168 and three screws 171, 172, 173. By means of this adjustable three-point support, mirror 94 can be brought into any desirable position, as tipped at an angle preferably of approximately 19° as shown in Fig. 9, corresponding to a distance between ball and its virtual image of about 6 mm.

For eliminating the reflected image of ball 91, a shutter 175 is provided which is mounted on shaft 176 having an exterior crank 177 permitting rotation of the shutter from position 175 (Fig. 12) to position 175'. The crank handle may have a small extension engaging a cup 179 of housing wall 142 when the shutter is in raised position. The housing may also have figure marks "1" and "2" near the upper and lower positions of the crank handle in order to indicate whether one or two images are visible with the respective position of the shutter. A cover 178 is provided which extends over the top of the lamp housing and also the entire lamp, leaving only the front side of the slider housing open for observation of the ball and its image.

It will now be understood, remembering the explanation of Fig. 9, that the focusing device is in correct position if both, ball 91 and its image, appear as of equal size. The conjugate point is then at 90, halfway between ball and image. If a pointer 152 is arranged underneath the mirror, as indicated in Figs. 9 and 12, the focal distance can be read directly on scale 483 of arm 481.

Devices of this type can also be used for determining astigmatic errors. By suitable means, as for example the above-described shutter 175, one object, here the image, can be obliterated. The focusing object is then moved until the remaining single object forms the sharpest and most concentrated line image corresponding to the astigmatic focal lines, as schematically indicated in Fig. 11, where 111 and 112, respectively, represent these line images, which are separated by the astigmatic interval $a$. By placing a pointer directly under the object used for this measurement, it is possible directly to determine the interval $a$ by subtracting the readings for the two sharpest line images. In Fig. 12, for example, pointer 152 is mounted directly below ball 93, which is used for taking astigmatic measurements after its image is eliminated with the aid of shutter 175.

For a more precise determination of the astigmatic conditions the following arangement, which may either be used alone, or in connection with a double-image arrangement, is preferred: A plurality of small illuminated objects, as for example several pinholes, or for example little polished metal balls 121, 122, 123, as shown in Figs. 14, 15, and 16, are mounted on axis 127 rotatable about a point 124 in the line of sight $d$. The objects are suitably illuminated, in the case of the three balls of Fig. 15, by means of a lamp 125 behind a lens 126, which directs parallel light rays toward the balls, which reflect it towards the eye OD. The device is moved backward and forward until the balls appear as sharp lines, indicating that they are located in one of the conjugate lines. If the direction of axis 127 does not correspond with one of the axis of astigmatism, the balls appear as three parallel lines, as shown in Fig. 14. If the balls are now rotated about axis $d$ until the line images coincide, or are in the direction of one straight line, as shown in Fig. 16, line 127 defines the astigmatic axis which can then be determined by suitable means, as for example the pointer and protractor scale of the practical embodiment of such a device which will now be described.

Referring to Figs. 17, 18 and 19, the side arm or other guide member of the instrument is again shown at 481, and a slider casting 141 of suitable construction is provided, which may be quite similar to the one shown in Figs. 12 and 13, and is therefore not again described in detail. A spindle 181 supports three light-reflecting spheres 121, 122, 123, which may be $\frac{1}{16}$" diameter chromium plated bearing balls soldered to the spindle. To the outside of the back wall is secured a dial 182 with a protractor scale, as shown in Fig. 17. The spindle 181 is journaled in a hole piercing both back wall 147 and dial 182, and is secured by collars 183 and 184. A knurled knob 185 is provided for turning spindle and balls, and a pointer 186, for example, fastened to collar 183 and playing over the protractor scale, permits evaluation of the angular position of the focusing object.

The balls are illuminated by a small lamp 187, whose light is collimated by a lens 188 fastened in the lamp housing 141, for example, by means of a mount 189. A cover 191, for example of sheet metal, extends over the top of the slider and the lamp, excluding from the patient's eyes all light rays excepting those coming from the spheres along the line of sight $d$.

In certain instances it was found desirable to perform the refractory measurements with monochromatic light, which makes abnormalities in the dioptric images formed on the retina more evident and therefore easier to correct. To this end provision is made, according to the invention, to use monochromatic light in the focusing device, either for direct or indirect illumination of the test object. For example, as illustrated in Fig. 19, a suitable filter 192 may be removably inserted between lamp 187 and lens 188.

In operating this device, the slider is first moved back and forth on arm 481 until each light point is extended into a line, as shown in Fig. 14. The knob 185 is then rotated until the astigmatic images line up, as shown in Fig. 16, whereupon the axis of astigmatism can be read on scale 182 with the aid of pointer 186. The focal distances, and the astigmatic interval are determined with a pointer mounted below balls 121, 122, 123.

For an especially precise determination of the refractory conditions of the eyes including astigmatism, I use a focusing device built on principles similar to those explained hereinbefore, but modified to permit the convenient consecutive presentation to the patient of single and multiple star images as well as of a line image, which is especially suited for the determination of the amount of astigmatism.

This device, shown in Figs. 20 to 24, has a slider part 741 (similar to member 141 of Figs. 12 and 13) adapted to be moved along arm 481 of the instrument and having an indicator 752 playing over the scale 483. Fastened by means of posts 701 and 702 at the correct height on slider 741 is a lamp housing 710 having a flange 711 with a protector scale 712 (Fig. 22). Within the housing is fitted the tubular portion 716 of a test object mount 715 which also has a flange 717 fitting flange 711 of the housing, and a rim 718. Lamp housing 710 and mount 715 are secured together by means of a U-shaped spring 721 which engages a recessed portion 722 of mount 715 through slots 723 and 724 of housing 710 (Fig. 22). Since spring, recess and slots have substantially equal widths, mount 715 can turn within housing 710, but is prevented from moving axially therein. The spring 721 can be easily removed, whereupon mount and housing can be separated for cleaning, replacing the lamp, and similar purposes.

An object support ring 731 having a circular recess 732 fits within the rim 718 of mount 715. The support ring 731 holds an object plate 734 and a filter 735, which are secured to the ring by suitable means (not shown) and covered by a cover plate 736 fastened to rim 718 with screws 737 and 738.

Within the housing 710 is mounted a small incandescent lamp 742, for example on a socket element 743 having a flange 744 closing the lamp housing and having an appropriate opening for leads 745 supplying current to lamp 742.

The object plate 734 is a glass disk that is silvered or otherwise coated, preferably at the inner surface 751. Into the silver or other coating are scratched an infinitesimally small central point opening 752 (Fig. 23), two similar points 753 and 754 arranged in a straight line with 752, and a similarly thin line 755 at right angles to the line formed by points 752, 753 and 754. Various portions of this scratched-in design can be made visible by the following arrangement.

The cover plate 736, which constitutes a mask for the object plate, has a slot 756 and a window 757 (Fig. 20). In three different angular positions corresponding to notches 761, 762, 763, slot 756 exposes either line 755 and center point 752 (as shown in Fig. 20), or point 752 alone (in intermediate position corresponding to notch 762), or all three points 752, 753, 754 (in position at right angles to the position of Fig. 20), respectively. In these positions, window 757 shows marks 765, 766, 767, respectively, provided on ring 731, which marks indicate to the clinician the object configuration visible at any particular time, so that he does not have to observe the illuminated object itself, which would be inconvenient, since it is only well visible from points near the instrument arm carrying the focusing object, or from the position of the patient.

Screwed to flange 718 of mount 715 is a handle 771 which is hollow and aligned with a perforation of flange 718. A pin 772 within the handle, and protruding through the perforation is forced by spring 773 towards notched ring 731 and therefore adapted to fix the relative position of mount 715 and ring 731 in three different ways, corresponding to notches 761, 762 and 763, which tend to retain pin 772, but permit its disengagement and shifting to another notch by the use of a certain amount of force. In order to facilitate this adjustment, a knob 774 (Fig. 24) is screwed to ring 731, which knob moves within an arc represented and limited by cut-out 775 of ring 718 and a corresponding arcuate cut-out 776 (Fig. 20) of cover plate 736. Handle 771 has a pointer 777 moving over protractor scale 712.

It will now be evident that by grasping handle 771 and knob 774, the relative position of glass 734 and cover plate 736 can be adjusted to show through slit 756 any one of the three possible object combinations "single point", "three points", or "line and point", whereby the object presented to the patient is indicated by one of the marks on ring 731 showing through window 757. The desired object configuration or pattern exposed through slot 756 can then be rotated by means of handle 771 engaging the respective notch of ring 731, the position of the test object relative to the axis being indicated on the protractor scale by pointer 777.

The operation of this device is quite similar to that of the previously described focusing objects, with the difference that the single point is used for refractory tests generally, the three points especially for determining the axis of astigmatism, and the line for measuring the astigmatic interval a (also known as the interval of Sturm), as will be described more in detail hereinafter.

It will now be evident that the various modifications and features of focusing devices, as above described, may be either used separately or combined, and that the testing method according to the invention can be carried out with the aid of any arrangement functioning according to the principles upon which this method is based.

It has been mentioned before that lenses may be inserted between the eyes and test objects for the purpose of optically changing the distance between eye and object, so that a very wide range of apparent distances can be utilized without making the instrument cumbersome. This general effect of optically changing the testing distance can be accomplished with any lens of suitable power inserted between eye and test object. In contradistinction to this arrangement, and according to the present invention, a lens of positive power is positioned between object and eye at its focal length from the nodal point of the eye. This simple expedient attains the very valuable result that objects of finite size, seen through such a lens, are imaged, and will appear to the eye of approximately the same angular size, no matter at what distance from the lens the object may be located, for the following reasons:

Referring to Fig. 25 (and also to Fig. 1, which shows the arrangement in question in combination with focusing objects O and Q indirectly viewed with the aid of mirror N), G is a positive lens arranged at its focal length $f$ from the nodal point H of eye OD looking in direction $n$. If lens G is placed in this manner, objects O', O, O'' at different distances, and of the same size, will subtend approximately the same angular size on the retina, and therefore appear of equal size, although their linear images $o'$ $o$, $o''$ are of different size, as will be evident to anyone skilled in the art from the elementary method of determining the magnification of objects by lens systems, as indicated in dotted lines in Fig. 25, where O''' is the enlarged virtual image of O'.

Some of the practical advantages of this arrangement are the following ones. In determining the optical distance of an object which is conjugate to the eye, that is, in determining the focus of the eye, the focusing device is moved towards and away from the eye until the test object—be it a letter or other design, or a bright point, or several bright objects—becomes sharp. Without special provisions, the object appears smaller when the target is pushed away, and larger when it is brought nearer, which tends to relax and to stimulate the accommodation of the eye. Such changes in the accommodative condition of the eye make accurate determination of the points conjugate to the retina at a given convergence fixation difficult and inaccurate. With the arrangement according to the invention, however, the test object, no matter at what distance, appears always approximately of the same angular size and these difficulties are therefore inherently eliminated.

A further advantage of putting the lens G at its focal length from the nodal point of the eye is the following one. Due to the fact that it is most convenient for the purpose of translation of presciption to express the relative size of the ocular image in terms of angles subtended at the nodal points of the eyes, it is advantageous in order to simplify the concepts involved, to use the nodal point also as the zero point from which the refractive power of the eye is determined, making use of the formula for the so-called "nodal point vergence". That is, dioptric distances which are the reciprocal of actual distances in meters are calculated from the nodal points, and an object 1 m. from the nodal point will be 1 diopter away, an object 50 cm. from the nodal point 2 diopters away, etc.

Now if a point at the focal length of any plus lens is used as the zero point from which to determine the dioptric distances of the apparent position of objects on the other side of the lens, the dioptric intervals become linearly related. With a 5.0 diopter lens, this linear relationship is such that one centimeter on the scale equals just 0.25 diopter, which is a considerable advantage in simplification.

The choice of the particular power of lens G is one of convenience, as long as it is placed at its focal length from the nodal point of the eye. With the instruments described hereinafter, a power of plus 5.0 diopters provides scales of convenient length at a convenient distance from the eye. As mentioned before, with lenses of this power, the distance of the two light sources of focusing devices with double objects should be about 6 cm. in order to provide convenient operation.

Referring more particularly to Figs. 26 to 32, a practical testing instrument will now be described which is especially characterized by its convenient size and simple construction, and which will be preferably used in cases where the available space is limited. This instrument includes one size target mounted at near distance, corresponding, for example, to element A—B of Fig. 1, and a focusing device corresponding to R of Fig. 1, and devices whereby these elements can be used either for testing straight-ahead distant vision, or for testing with the eyes inclined for near vision, and several other novel and useful features which will become apparent from the following description of this instrument and its use.

In Figs. 26 to 32, where like characters of reference designate like parts throughout the several views, 201 is a head rest for supporting the head of the patient and maintaining his eyes in a fixed position during the tests. The head rest 201 comprises a chin-supporting portion 202 and a pair of forehead rests 203, which are adjustable by means of suitable screw-thread devices 260 and 270 having scale and indicator means 280 and 290 thereon for determining the positions at which they are adjusted for different persons, so that their positions can be exactly reproduced.

Corneal aligning sights 264 are provided adjacent the head rest 201 for positioning the eyes relative to the test means of the instrument. Those sights are arranged in alignment with holes 261 of pivots 256. Directly in front of the head rest 201 and within the direct field of vision is the shield 205 of a size target, having a fixation mark 206, corresponding to F of Fig. 1, located centrally thereof and a plurality of pinhole openings 207 surrounding the fixation object. In this embodiment, a target with eight openings is shown, two of the pinholes 207 being positioned in the vertical meridian of the shield, one on each side of the fixation mark 206, two in the horizontal meridian, and two substantially in the 45° meridians between the vertical and horizontal meridians and on opposite sides of the fixation mark. Behind each pinhole opening, as illustrated in Fig. 29, is mounted a lamp 208. A screen 209 with openings 210 is positioned between the lamps 208 and the respective pinhole openings 207, so that the lamps are visible to only one eye, in a manner which will be evident from the foregoing description, and which is indicated in Fig. 29 similar as in Fig. 2. The target presents to the eye receiving the light a plurality of illuminated spots or stars, and to the eye from which the light is shielded a plurality of black spots. This causes the single target to appear as two separate charts which are inherently of like dimensions. The spatial relation of the bright and dark spots, both originating at the holes 207, to the fixation object 206 at the center is also inherently invariable, as has been explained before.

The shield 205 has a central opening 211, surrounded by the fixation mark, through which a focusing device, which will hereinafter be described in detail, may be viewed. Between the target 205 and the head rest 201, and directly in front of each eye, there is provided a trial lens cell 212 corresponding to elements 18 and 19 of Fig. 1, receiving corrective lenses during the tests. These lenses may be size lenses according to Patent No. 1,933,578, of November 7, 1933, and computed to magnify or reduce the overall dimensions of the image of each eye or selected meridians thereof without changing focus. It is to be understood, however, that lenses for changing focus can be used either separately or in combination with the size lenses if necessary. A prism lens 213 and a plus lens 214 of proper powers to position the test chart 205 effectively at a desired distance from the eyes, can be placed between head rest and test chart in holders pivoted for movement into and out of alignment with the eyes. The prism lenses are for the purpose of changing the vergence of the eyes and, together with the power lenses, for virtually moving the size target to points at distances greater than its actual distance from the eyes.

Perforated screen members 215 for each eye corresponding to masks 25 and 26 of Fig. 1, are mounted between head rest 201 and target 205 on hinged holders for movement into and out of alignment with the respective eye. The openings in screens 215 are of different shapes to prevent the forming of similar marginal images in both eyes, but are preferably of such comparative sizes as to pass equal fluxes of light.

The sets of trial lens cells 212, lenses 213 and 214 and screens 215 are mounted on separate supports which are slidably adjustable towards and away from each other internally of the slideway 216 to permit their adjustment to the varying pupillary distances of different individuals. Each of the separate supports is provided with a rack 217 meshing with a pinion, not shown, and operated by a thumb wheel 218. Suitable scales 219 are provided on each of the separate supports to determine the amount of movement thereof relative to slide 216 and their positions with respect to each other.

This arrangement is for evaluating the differences of the ocular image of one eye relative to that of the other, and for examining phorias. The tests are made at two different distances, preferably that of approximately 40 cm. or normal reading distance, and that of approximately 6 m. or distant vision.

In combination with the above means for testing image differences and phorias there is provided a novel means for testing the refractive conditions of the eyes. To aid in accomplishing these tests there is provided a fixation chart 220. The said chart 220 is hinged at 221 to the shield of target 205 so that it may be moved to a position wherein it overlies the said target 205. The chart 220 is provided, as shown in Fig. 32, with suitable fixation means such as print 222. The chart 220 is also provided with a central opening 223 with cross line fixation means 224 therein. The openings 223 and 211 in elements 205 and 220, respectively, are in direct alignment when the chart 220 is folded down for use.

On the side of the chart 220 opposite the patient and mounted on a slideway 225 there is provided a transverse slide 226. The slide 226, as shown in Figs. 27 and 28, is provided with a blank white spot 227, refractive test means 228, an astigmatic chart 229 and a sight opening 230. Each of the above means 227 to 230 inclusive is adapted to be separately aligned with a tubular support 231 having a projection lens 232 and illuminating means 252 therein (Fig. 29). The tube 231 is slidably mounted on the slideway 225 and can be moved longitudinally thereof towards and away from the patient by means of a cord 233 operated by a hand wheel 234 in reach of the patient. The cord 233 passes over a plurality of idler pulleys 235 and is attached to the opposite ends of support 231 as shown at 236 and 237, causing the latter to move in opposite directions longitudinally of the slideway 225 when the hand wheel 234 is rotated in opposite directions. Suitable scale and indicator means 238 and 239 are provided on slideway 225 and support 231, respectively, to determine the position of the test means 228 or 229, as the case may be, relative to the eye under test. The slideway 225 is pivoted at 240 (corresponding to axis 40 of Fig. 1) in the plane of the shield 205, as shown in Figs. 26 and 29, so that the test objects 228 or 229 may be moved laterally into alignment with each eye separately. The lateral adjustment of the slideway 225 about its pivot 240 is accomplished in a manner similar to that of the longitudinal adjustment of the support 231, by means of a cord 241 which passes over a plurality of idler pulleys 242 and which is operated by a hand wheel 243 (Fig. 29). The hand wheel 243 is in reach of the patient on the side of the instrument opposite the hand wheel 234.

A screen 244 of substantially the same color, and illuminated with approximately the same intensity as shield 205 and fixation chart 220 is positioned between support 231 and shield 205. This screen 244 appears to the eye not under test as part of the back field of shield 205, and prevents any irritating impression of space. Screen 244 is provided with a central opening 245 through which the test means 228 or 229 are visible to the eye under test. The projection lens 232 between screen 244 and test objects 228 or 229 is adapted to project an aerial image of these means to be viewed by the eye under test. A lens 246 (corresponding to lens G'' of Fig. 1), placed in the opening 211 of shield 205 at its focal distance from the nodal points of the eyes provides means for preventing a change in the size of the projected image when the support 231 is adjusted longitudinally of the slideway 225. The appearance of the test means 228 when at a point conjugate to the retina of the eye under test is shown in Fig. 32. To insure that the slideway 225 and the test means thereon are in accurate alignment with the eye under test when adjusted from one eye to the other, there are provided stops 248. Stops 248 are adjustable relative to a scale 249 to vary their positions amounts sufficient to compensate for the differences in the pupillary distance of different individuals.

The surfaces of members 205, 220 and 244, and slide 226 are illuminated by suitable illuminating means 250, 251 and 252.

The chart 229 which is used in testing astigmatism is rotatably supported on the slide 226 and is provided with an indicator 253 and protractor scale 254 to determine the amount of rotatory adjustment. It is understood that instead of this focusing device, arrangements as described with reference to Figs. 6 to 24 can be slidingly mounted upon track 225 and used analogously.

The entire apparatus described above for performing the various tests is supported on a frame 255 which is pivoted at 256 to the head rest 201 so that the test means may be adjusted upwardly and downwardly relative to the head support to test the eyes at varying positions in which they are actually used. A suitable support 257 is provided to hold the frame 255 at various adjusted positions.

The instrument now to be described with reference to Figs. 33 to 62 is somewhat more elaborate than the previously described modification. It includes novel devices for positioning the eyes of the patient, one size target in reading position (K—L of Fig. 1), a separate target for distant vision (A—B of Fig. 1), and indirectly viewed focus measuring devices adapted to cooperate with each target, corresponding to members O and Q of Fig. 1, with novel provisions for using these focusing devices with either target.

Referring more particularly to Figs. 33 to 35, numeral 301 denotes a rigid base with a head rest bed 302; 303 is a machined face to which the instrument foot 304 is secured, and 305 is a support for near target 310. The base rests on three capstan screws 306, 307, 308, permitting exact leveling of the instrument after it has been placed on an instrument table or similar support of suitable height.

The head rest bed 302, as shown in Fig. 38, has a recess 311 permitting movement of head rest column 312, two windows 318 and 319, and a groove 314, to one side of which is screwed a rack 315.

The head rest slide 316 (Figs. 33, 34, 37 to 42) has a groove 321 in which slides a transverse guide key and rack 322 meshing with a pinion 323 in a recess 324 of the slide plate 316 (Fig. 39). The pinion sets on a shaft 325 with knurled knob 326 permitting rotation of the pinion 323 (Fig. 37).

Screwed to key rack 321 is a longitudinal key 331 to which is fixed a pinion block 332 pivotally supporting shaft 333 with pinion 334 and knob 336. Pinion 334 meshes with rack 315 fastened to bed 302, as described above. Slide 316 has further a window 335, and is integral with head rest column 312. A crosspiece 341 (Figs. 38 and 40) slides with its upper face upon the lower machined face 342 of bed 302 and is secured with pins 343 and 344 to slide 316. The pins pass through windows 318 and 319, which give sufficient clearance for lateral and longitudinal movement of crosspiece and slide. Pin 344 is screwed into plate 316 with sufficient play to permit sliding, whereas pin 343 has a threaded portion extending above the slide plate and bearing a thumb nut 345 by means of which screw 343 can be tightened and the slide fixed.

It will now be evident that by turning knob 326, slide plate 316 can be moved in lateral direction (along axis 7 of Fig. 1), since pinion 323, journaled in slide 316, meshes with rack 322 that is fixed in lateral direction through key 331 sliding in longitudinal groove 314 of bed 302. Actuation of knob 336 causes longitudinal movement of slide 316 (along axis 9 of Fig. 1), since pinion 334—fixed by means of block 332 to key 331 and hence to key rack 322 and with respect to axis 9 to slide 316—meshes with rack 315, fixed to the bed in groove 314. In this manner, the head rest can be adjusted along principal axes 7 and 9 by means of knobs 326 and 336, and fixed in any position with lock nut 345. The amount of adjustment can be determined, for reproduction of the head rest position, by means of two scales 346 and 347 for the transverse and longitudinal movements respectively, the corresponding indices being provided on slide plate 316 and key rack 322, respectively, as shown in Figs. 37 and 42.

The following provisions permit adjustment of the head rest along vertical axis 8. The hollow head rest column 312 carried by slide plate 316 (Figs. 33, 34, 40, 42 to 44) supports a sleeve 351, which, like column 312, is slotted at 352. Upon sleeve 351 rests a knurled nut 356 with screw spindle 355, nut 356 being secured by means of a semi-annular key 357 screwed to sleeve 351 and engaging recess 358 of nut 356. Spindle 355 is slotted as indicated at 359 (Fig. 44), key 361 of sleeve 351 (Figs. 40 and 44) engaging slot 359 and preventing rotation of spindle 355. A pointer 362 is fastened to spindle 355 and adapted to move along a scale 363 fastened to sleeve 351.

It will now be evident that rotation of knurled nut 356 moves spindle 355 in the direction of axis 8 of Fig. 1, and that the amount of adjustment can be determined with the aid of scale 363 and pointer 362.

Column 312 and collar 366 fastened to sleeve 351 have corresponding extensions 371 and 372 respectively (Figs. 40 and 42). Extension 371 has a threaded hole carrying a screw 373 with knurled knob 374. A U-shaped spring 375 is attached with one end to extension 372, whereas its other end is forked to engage the recessed end of screw 373. When knob 374 is turned, spring 375 moves extension 372 back and forth and takes up the alignment discrepancy due to the relative rotatory movement of extensions 371 and 372. In this manner, the head rest can be rotated about axis 8 of Fig. 1. The amount of this adjustment can be determined with the aid of scale 377 on column 312 and index 378 on collar 366 (Fig. 34).

To the upper end of screw spindle 355 is fastened an arcuate grooved slide block 381 supporting arcuate slide 382 to which are fastened chin rest 10 and pivot arms 383 and 384 (Figs. 33, 34, 36, 42). A thumb screw 385 pivoted in block 381 (Fig. 42) but fixed in longitudinal direction by suitable collars or similar means, engages a thread in the lower part of fork 350, whose inner face rests against the faces of members 381 and 382 and which is therefore confined to movement in the plane of these faces. The fork 350 engages pin 387 screwed into slide 382. Actuation of screw 385 therefore causes member 382 to slide in the groove of block 381, to which it is secured by means of studs 388 screwed into either side of slide 382, moving in slots 389 of block 381, and pressing the two elements 381 and 382 together due to the action of spring 340 between the stud heads and washers 391. The amount of rotation about axis 7 can be determined by means of scale 392 on slide 382 and pointer 393 on block 381 (Fig. 34).

Upon pivots 383 and 384 (Fig. 36) is journaled a brace 394 with two journal sleeves 395 and 396 and two clamp extensions 397 and 398 which hold a face loop 399 (Figs. 33 and 34) with cups 11 and 12 by means of clamp screws 380 and 390. A screw 370 in brace 394 rests against slide 382 and permits rotation of the face loop about axis 7 defined by pivots 395 and 396. The amount of this adjustment can be determined by scale 339 on slide 382 and index 360 on brace 394 (Fig. 33).

The instrument foot 304 has two side arms 401 and 402 to which are rigidly fastened rods 403 and 404 (Figs. 33, 34, 45 to 47). On the inside of arm 402 is a cam block 406 with a cam groove, as indicated at 407 of Fig. 47.

A crosspiece 411 (Figs. 46, 47) has a connecting web 412 and two flanges 414 and 415 with perforated bosses 416 sliding on rods 403 and 404. One of these bosses (416 of Fig. 33) is split and has a lock screw 417 with the aid of which crosspiece 411 can be fixed at any desired position. Flange 415 has also two stop extensions 418 and 419.

An axle 421 passes crosswise through member 411 to which it is fixed by appropriate means. Journaled upon this axle with two sleeves 422 and 423 is bridge 425, which supports the side arms and other devices of the instrument in a manner to be described hereinafter. Also journaled upon axle 421, adjacent to sleeve 423, is a bell-crank 426 having a fork 427 at one end and a follower roller 428 at the other end (Figs. 34 and 47). Fork 427 rotatably engages one end of spring rod 431, which extends at either side of web 424 of bridge 425 through a perforation of the web, strong springs 432 and 433 (which bear against washers 434 and 435, pinned to rod 431, and web 424, respectively) tending to maintain rod 431 in the intermediate position shown in Fig. 47. Follower roll 428 extends into cam groove 407 of cam extension 406, described before. A stop pin 437 is fastened to rib 438 of bridge 425 (Figs. 33 and 47), between stop extensions 418 and 419 described before.

This arrangement has the purpose of tilting bridge 425 about axis $h$ of Fig. 1. As schematically illustrated in Fig. 48, an element, here bridge 425, can be rotated about point CD by first moving it parallel to itself along line 404 into position 425' and by subsequently rotating it about axis 421' into position 425'' by angle $\delta$. It will now be understood that bridge 425 can be tilted about axis $h$ as follows:

After loosening screw 417, crosspiece 411 is permitted to slide downwardly on rods 402 and 404 from the position shown in Figs. 33 and 47, this movement corresponding to the transposition of 421 to 421' in Fig. 48. During this movement follower 428, which is fastened with bell-crank 426 to bridge 425, causes the latter to tilt about axle 421, which movement corresponds to the transposition of 425' to 425'' in Fig. 48. The correct amount of movement is determined by stop 419 contacting with extension 437, as indicated in Figs. 33 and 47. The resilient connection between follower 428 and bridge 425, by means of springs 432 and 433, assures the exact maintenance of the movement of the bridge and adjustment thereof by means of screws 439 in stop extensions 418 and 419. The return movement takes place accordingly, the bridge being secured in raised position by means of screw 417.

It will be evident that this arrangement is preferable if only tilting about a fairly constant angle is desired, in this case the "reading angle" of $\delta = 20°$, for which purpose the described device provides a convenient, exact and comparatively cheap means. If tests with widely varying tilting angles have to be carried out, arrangements similar to that of Fig. 26, or that shown in co-pending application Serial No. 618,200, filed June 20, 1932, or arrangements making use of arcuate guides, are preferable. It will be observed that the device according to Fig. 47 is especially compact since it occupies a comparatively small space that is, moreover, not needed for other purposes, whereas arrangements using actual pivots in axis $h$ are necessarily rather cumbersome and apt to obstruct the space at both sides of the head. It will be further observed that by making stops 439 adjustable within wider limits, any desired tilting angle can be obtained with this arrangement.

This instrument also comprises arrangements, now to be described, for changing the distance between points CD and CS (Fig. 1) along axis $h$, in order to adjust the instrument to varying pupillary distances, and provisions for changing the inclination of lines of sight $s$ and $d$ relative to $h$, in order to obtain different vergence angles, corresponding for example to positions of near and distant vision, when the eyes are looking at fixation marks E and F, respectively.

Referring more particularly to Figs. 33, 34, 35, 47 and 49, bridge 425, which can be tilted as described above, has at each side a flat upper surface with linear grooves 451 cut in the direction of axis $h$. Upon these surfaces rest intermediate plates 452 having at their lower faces straight keys 453 fitting into grooves 451 and preventing any relative motion between bridge 425 and plates 452 excepting linear movement along axis $h$. The upper faces of plates 452 are provided with arcuate grooves 454 cut with points CD and CS as centers and receiving arcuate keys 455 of top plates 456. Intermediate and top plates are held in contact with one another and with the bridge by means of screw studs 457 fixed to the bridge and extending upwardly through plates 452 and 456, which have appropriate straight and arcuate slots 459 and 460, respectively. A thumb nut 458 permits rigid fixation of the plates to the bridge.

Since the present instrument has two main positions and therefore two principal convergences, namely, those at fixation points F and E, it is desirable to move axes $s$ and $d$ quickly from one position to the other without being forced to read scales or to make adjustments. For this purpose, stop plates 441 are screwed to top plates 456, from which extend stop pins 442 through windows 443 of the stop plates. The two faces 444 and 445 are so arranged that axes $s$ and $d$ are in position for convergence at F when stops 442 rest against faces 444, and for convergence at E when the stops touch faces 445. After loosening nuts 458, the top plates 456 can be easily moved on their arcuate guides from one position to the other, and again fixed by tightening nuts 458.

Fastened to both sides of the bridge are blocks 461 in which screws 462 turn between collars 463 and 464, extending into threaded holes of intermediate plates 452 so that, by turning screws 462, the intermediate plates 452 can be shifted along axis $h$ in order to adjust the instrument for varying pupillary distances. The magnitudes of the adjustment may be read on scales 465 and 466 on plates 452, with the aid of marks 468 on bridge 425.

The top plates 456 have, approximately at right angles, blocks 471, 472, 473 for mounting lens holders, side arms, and reflectors respectively (Figs. 35, 47, and 49). The present instrument is shown as equipped with lens sets providing continuous image size change, constructed according to the above mentioned copending application Serial No. 713,710.

This device includes fixed holders 446 for stationary lenses indicated at 16 and 17 of Fig. 1, and relatively movable double supports 447 and 448 for lens sets 18 and 19, which comprise lens elements whose separation is adjustable by means of rack and pinion drives operated by means of knobs 475 and 476. Since this device does not form part of the present invention, it will not be described in detail, but it should be kept in mind that corrective lenses 16 to 19 are arranged in the lines of sight $s$ and $d$ and move with top plates 456 when the latter are displaced for adjustment of axes $s$ and $d$ by rotation about axes $w$ and $v$, or about axis $h$, or by linear motion along axis $h$.

Fastened to block 473 are flanges or holders 477 receiving semi-transparent reflectors M and N arranged as shown in Figs. 1, 34, 35, and 47. These mirrors are preferably mounted in frames sliding in grooved holders 477.

As shown in Fig. 35, diaphragms 470 are mounted on the mirror holders, one diaphragm having a square opening and the other a round opening, corresponding to the masks 25 and 26 of Fig. 1.

For obstructing the view beyond the mirrors, a small shield 450 is provided which can be hung on to the diaphragms, covering the openings of the latter. The obstruction of the direct line of vision of one eye is required when determining phorias with dissociated eyes.

To blocks 472 are screwed arms 481 and 482, preferably of U-section (Fig. 49), upon which slide focusing objects of the type described heretofore. The arms have scales 483 permitting the direct reading of the focal length of the eyes under investigation, as described above. Journaled upon axle 421, one on each side of the instrument, are pulleys 484 on hubs 485 to which are fastened hand wheels 486. Within the arms are rollers 487 and 488, and eyes 489 are screwed to bridge 425. On each side, a cord 480 is wound about pulley 484, threaded through eyes 489, carried over rollers 487 and 488, and fastened to lamp housing 141, as indicated in Figs. 13 and 18, by means of a post 195 fastened to plate 151. Springs 196 keep the cords taut. By turning wheels 486, the focusing devices can be moved back and forth upon the arms.

Fixed to arms 481 and 482 are also lens mounts 491 and 492 for lenses G and G' at their focal distances from the nodal points of the eyes, as described above with reference to Fig. 25. Perforated shields 493 may be slipped over these lens mounts, in order to obstruct all objects except the focusing devices in order to exclude all causes of distraction.

For aligning the eyes, cornea sights 494 and 495 are provided (Figs. 33, 34, and 47) which are rotatably mounted on inclined pivots 496 and 497 so that they may be turned upwardly into aligning position, as shown in Fig. 34, and tilted back out of the way, as shown in Fig. 47.

As mentioned before, this instrument comprises two size targets corresponding to elements A—B and K—L of Fig. 1. The target 310 for near vision is mounted directly on the instrument, as shown in Fig. 33, whereas the target for distant vision must be placed in proper alignment with the instrument, for example, near the wall of a room provided for this purpose, at the chosen distance from C, for example, 20 ft. The two targets should have the dimensional relations explained in connection with Figs. 2 and 5. The smaller target 310 will be described first.

As shown in Figs. 33 and 50, this target is mounted on support 305, which has a flange 500 to which a target box is screwed that consists of four walls 501, 502, 503, 504 (Figs. 50 to 54), which form a rigid frame for the other elements of the target. The front opening of the frame is covered with a plate 506 of white material (constituting shield K of Fig. 1), as for example mat celluloid, with a black circle 507 (Fig. 52) as a fixation mark corresponding to fixation object E of Fig. 1, in the center. At equal distances around this mark are disposed holes 511, 512, 513, 514, corresponding to openings 1, 2, 3, 4 of Fig. 1. In this embodiment, four minute circular holes disposed in the horizontal and vertical meridians, at a distance of about 28 mm. from the center of the fixation mark, of approximately 0.1 mm. diameter, have been found practical, although it is understood that any other number or arrangement of holes may be preferable under certain test conditions.

At the back, at a distance of about 50 mm. from shield 506, is mounted a ground glass 515 covering the entire back opening of the frame, to which it is fixed. Held in grooves of walls 501, 502, 504 and protruding at the top through a slit 517 of wall 503 is an opaque screen 516 with rectangular windows 521, 522, 523 and 524 disposed as shown in Figs. 52 and 53, namely, with their vertical edges so arranged that they correspond to lines 23 intermediate points corresponding to points 21 and 22 of Fig. 1, with the window openings to the left of 23, as shown in Fig. 52, or to the right thereof, as shown in Fig. 53. It will be evident that either position can be obtained by lifting screen 516 from the frame, for example, with the aid of flap 556, and inserting it with the proper side in front. The position of Fig. 53 corresponds to the diagram Fig. 1, where the left eye sees perforations 1, 2, 3, 4 (here holes 511, 512, 513, 514) as bright stars and the right eye as dark spots, and the corresponding front side of the flap 526 is therefore marked "Left eye". Upon reversing screen 516, as indicated in Fig. 52, the left eye sees dark spots and the right eye bright stars. The other side of flap 516 is marked accordingly.

It is, of course, understood that in order to obtain this effect, eyes and screen must be placed, as indicated in Fig. 1, that is, that the eyes must be so positioned that a line $h$ joining the nodal points is parallel to the target planes, and that axis $b$, perpendicular to line $h$ halfway between the eyes intersects the target at its center E. Both eyes will then see and fuse the black mark 507, whereas one eye sees holes 511, 512, 513, 514 as black dots, since from its point of view only the opaque screen can be seen, and the other eye sees the holes as bright points, since from its point of view only the illuminated plate 515 can be seen. The angle subtended to the nodal points of both eyes by the bright and dark points are inherently identical, since they have their origin at identical points, namely, the holes in shield 506. As described before, the dissimilar characters of the appearances can be interchanged by reversing screen 516.

To the top edge of the frame may be hinged a sheet 531 having upon its front face suitable test objects, as for example a conventional reading chart 532 and a fixation mark 533. In the position shown in Fig. 50, this sheet obstructs shield 506, whereas if turned up, as indicated at 531' and 531" of Fig. 51, it presents the target shield 506 as shown in Fig. 52.

The large, distant screen corresponding to A—B of Fig. 1 may be the frame structure shown in Figs. 55 to 57, where 540 are the members of a wooden structure covered, for example, with a suitably finished canvas shield 546 with openings 541, 542, 543, 544 around a black circle 547, corresponding to elements A, 1, 2, 3, and 4, and F, respectively, of Fig. 1. For this target, exactly the same arrangement of screens and lights could be used as that employed on the small target, with the dimensions increased in proportion to the greater distance, as indicated in Fig. 5, care being taken that the black circle serving as a fixation mark subtends the same angle, and the holes in the screen are of a size and position to appear the same angular size and at the same angular distance from the fixation mark as the corresponding elements of the small target.

However, such an arrangement would necessitate a great distance between planes A and B, and the following arrangement is therefore used according to the present invention.

Behind the holes of shield 546 are placed tubular structures 551 (Figs. 58 to 60) so designed and fastened to target structures 540 that their center lines lie on lines drawn from point C (Fig. 1) through holes 541, 542, 543, 544, that is, on lines indicated at $l$ and $r$ of Fig. 1. These tube structures include flanges 556, tubes 557 and lamp holders 558, flanges 556 being screwed to target structure 540, as shown in Figs. 56 and 57, and lamp holders 558 supporting lamp sockets 561 with lamps 562, whose filaments are approximately aligned with the centers of tubes 557.

A lens 564 of a power of about plus 10 diopters is mounted behind each hole (of about 5 mm. diameter) in tubes 557, and between lens and lamp is arranged a screen strip 565, slightly beyond the focal length of lens 564 behind the latter. Screen strip 565 is part of a lever 571, rotatably fastened to tube 557 at 572, and pivotally connected at 573 to a rod 574. Stops 575 and 576 with adjustment screws 577 and 578 limit the movement of lever 571 and permit exact alignment of edges 581 and 582 with the center line $l$ of tubes 557 and lenses 564. A toggle spring 584, pressing against a nose 585 of lever 571, tends to hold the latter in one of two positinos, that is, either with edge 581 or edge 582 at line $l$.

The distance of screen strip 565 from lens 564 is such that a sharp image of edge 581 or 582 is formed at the distance of the eyes of the observer and the median line of his head, that is, approximately at C of Fig. 1. If, as described before, edge 581 or 582 is positioned exactly vertically at line $l$, that is in the position of 23 of Fig. 1, one eye sees the screen strips through the holes and tubes as dark spots, whereas the other eye sees the lamps, through the same holes, as bright stars. It will now be evident that by properly setting the tubular structures, and their screen strips, one eye can be made to see only dark spots, and the other eye only bright points, whereas, by interchanging the positions of edges 581 and 582, the character of the holes, as appearing to the eyes, can be transferred from one eye to the other. Convenient means for bringing about this change are rods 474, which may be joined by cross head 586 connected to manipulating rod 587 with knob 588. By pulling or pushing knob 588, the screen strips 565 can be easily moved from one position to the other.

Instead of using a screen strip 565, arrangements with opaque screens having transparent slits, may be employed, as indicated in Figs. 61 and 62, where 590 is a frame with grooved longitudinal members 592, 593 in which slides a screen 594 having a slit 595 with edges 581' and 582' corresponding to edges 581 and 582 of Figs. 58 and 60, and suitably movable, for example, by means of a threaded rod 596. Frame 590 may be suitably mounted between lens 564 and lamp 562, for example on top of tube 557. By turning rod 596, either edge 581' or 582' can be aligned with axis k, the function of this device being otherwise the same as that of screen strip 565.

The various light sources of instruments of this type, namely, the lamps of the focusing objects and those illuminating the image difference targets should be controllable in convenient manner. It is desirable to vary the light intensities of the focusing objects, and to adjust the illumination of the size targets in such a manner that the shield A is seen at an intermediate intensity permitting good distinction of the black dots and the bright stars originating in light sources behind the target. Fig. 63 illustrates the illuminating circuit incorporated in the last described instrument, and Figs. 33 and 34 show the corresponding lamps, switches and other elements of this circuit. as applied to the near vision size target. Similar arrangements may be provided for controlling the illumination of the large target according to Figs. 55 to 57. The lamps 92, 92', for example of devices according to Fig. 12, are supplied from a suitable current source 601, preferably of low voltage with regard to the small lamps used in the focusing objects, through switches 602 and 603 and rheostats 604 and 605 (see Fig. 34), which permit separate switching and dimming of the focusing device lamps.

The front and back of the small target 310 are illuminated by small floodlights 611 and 612, suitably mounted upon holders 613 and 614. These floodlights are controlled by switch 615 and rheostats 616 and 617 (Fig. 33) which, for purposes pointed out hereinbefore, permit relative adjustment of the illumination at both sides of the target, lamp 611 illuminating shield 506 or sheet 531, and lamp 612 illuminating the perforations of 506 from behind, causing them to appear to one eye as bright spots.

A device for investigating phorias according to the present invention may be associated with the size targets as follows: A so-called phoria grid, shown in Fig. 64, drawn or printed on a suitable support, comprises two rectangularly crossing series of lines at equal distances equivalent to one prism diopter. These series of lines extend on either side of a horizontal and a vertical zero line, respectively, whose intersection forms a common zero point from which the horizontal and vertical lines are numbered as shown. This chart is fastened to a suitable support, for example a gate, that can be swung in front of the large target, so that the zero point will coincide with the center of the fixation object. A similar, proportionally smaller chart can be correspondingly placed on the small target, for testing muscular defects at near vision.

A complete eye examination, carried out according to the methods of the present invention, will now be outlined, whereby it is understood that these tests must not be necessarily performed with the aid of instruments herein specifically described, but that various other practical embodiments of such devices are feasible, as will be evident, for example, from the discussion of Fig. 1 of the present specification. For purposes of the following description, it will be assumed that the tests are made on an instrument according to Figs. 33 to 62, but it will now be evident in which manner other instrument embodiments must be operated for obtaining similar results.

Prior to any test, the operator will ascertain whether his instrument is correctly adjusted to conform with the scheme shown in Fig. 1. Especially will it be necessary to check the parallactic separation of the dissimilar configurations of the size target, and the absence from the targets of any spots or markings other than the fixation object, which might act as stimuli inducing fusion.

The head of the patient is then placed against chin rest 10 and forehead cups 11 and 12, whereupon the eyes are positioned with respect to the instrument. Exact positioning of the eyes is essential, since, for example, the distance of the eye from the trial power lenses appreciably affects size corrections, and improper alignment would make exact reading of dioptric and size measurement data impossible.

The instrument is first adjusted for the correct interpupillary distance by operating screws 462, 464, equal amounts of adjustment being set on each one of scales 465, 466 (Fig. 34) in order to place the eyes symmetrically to point C (Fig. 1). The head is then positioned with the aid of the six head rest movements until the pupils are aligned with the lens holders, that is, placed in axes s and d, and until the cornea poles are tangent to a line parallel to axis h and intersecting axis c at a distance of about $\frac{1}{16}$" outwardly from h, that is, the distance between cornea pole and center of rotation. The alignment of the pupils is preferably taken care of with the aid of a centering lens (that is, a lens whose optical center is marked) and a mirror arrangement, as for example similar to that described in connection with Fig. IV of copending application Serial No. 618,200. The corneas are aligned with the aid of sights 494, 495 which are so positioned that the eyes will be placed as above described if the cornea poles appear just to be touched by the points of the sights, which are swung down after this adjustment is made. All or most of the six adjusting movements are commonly necessary, in view of the fact that the eyes are in many cases placed unsymmetrically. A record of the readings on the six scales 330, 346, 347, 363, 377, and 392 is taken, so that the position can be exactly reproduced for future tests. This is important with the very sensitive tests here involved, where deviations between the spatial relationship of eyes and instrument during consecutive examinations may introduce considerable errors in the comparative evaluation of the test data.

Although the sequence of the various component test steps is not of primary importance, and they have often to be repeated and checked with one another, it is generally preferred to begin with the tests for phoria and fusional amplitude, and to follow with the dioptric and size tests for distant vision. These steps may be preceded by the conventional ophthalmometric and visual acuity tests, and by an examination whether or not simultaneous binocular vision is at all present. This latter test may be made with the aid of the focusing devices showing a row of points. Such a target is presented to each eye, so that the central points are placed virtually in the lines of vision of the eyes, and the lines formed by the dots positioned at right angles. If the patient has no suppression, he sees a cross formed by five dots, whereas constant or temporary disappearance of some of the dots indicates suppression.

For testing phorias, the phoria chart (Fig. 64) is placed on the distant size target (assuming that the tests for distant vision are made first), so that its zero point coincides for practical purposes with the center of the fixation mark of the target. One single point focusing object, for example a device according to Figs. 20 to 24 (adjusted for presentation of the single central point) is then illuminated and so placed that it appears to be superimposed without parallactic movement upon the zero point of the chart. This condition is attained when the arm with the focusing object is in correct position to establish vergence towards the center of the chart, and the light point, if it appears red due to the use of the described filter, is optically placed at a distance somewhat shorter than that of the chart. The eye seeing the focusing object is then shielded from the target by placing a blinder 450 (Fig. 47) on the mask 470 in front of one eye. If the patient has phoria, he thereupon sees the point light of the focusing object displaced from the zero point of the chart, the amount of displacement indicating nature and amount of phoria. If, for example, the right eye sees the point light and is screened from the target, the patient is exophoric if he observes the light to move to the left of the zero point, and he is esophoric if it moves to the right; right hyperphoria is indicated when the point moves below, left hyperphoria when it moves above. If both horizontal and vertical phorias are present, the point is displaced diagonally. The amount of phoria can be easily determined by reading the number of the line or lines to which the image has moved. Since the lines are one prism diopter apart, it is evident that this determination is very simple and consists merely in reading on the chart the position of the displaced light point. The test can be repeated with the point source of light before the other eye, with that eye shielded from the chart. The movement of the light point has then, of course, the opposite significance to that observed when the other eye was covered.

For measuring the positive and negative fusional amplitudes (adduction and abduction, respectively), the fixation object of the size target is used, the patient being told to look with both eyes at the black center disk. A rotatory adjustable prism, preferably of about 15 diopters, is inserted in one of the lens cells in front of each eye, with bases vertical. The prisms are then rotated, and the amount of prism power necessary to break fusion, outwardly and inwardly, gives the horizontal fusional amplitudes. For determining the vertical fusional amplitudes (hypoduction and hyperduction), the test is repeated with the prism bases horizontally.

For measuring the dioptric conditions of the eyes (again assuming that the tests for distant vision are made first), a focusing object (for example according to Figs. 20 to 24), for example on side arm 483, is lighted, the arms being set at the proper angle for the fixation object, that is, in the case of the instrument according to Figs. 33 to 62, moved to touch face 444 of window 443 (Fig. 35). If an instrument according to Figs. 26 to 29 is employed, the fixation chart 220 is optically placed at the proper distance for the test, in this case 20 ft., and slideway 225 and focusing object 228 are moved into alignment with one of the eyes.

The patient is now instructed to look at the fixation object and the operator moves one focusing object from the end of the arm inwardly. Assuming that the focusing device according to Figs. 20 to 24 is used, the single point is first presented to the patient, who is told to report when he sees the point sharply. Due to the effect of lens G, and if the patient's head is correctly positioned, the light appears to remain in one position and to change its appearance only blurring or becoming sharper depending whether it is moved in or out of focus. If the patient reports that he sees a line, he has astigmatism and the test is continued as will be described later. If he reports seeing a sharp point, he has practically no astigmatism. The patient is then asked to move the object back and forth by turning handle 486 (234 in case the smaller instrument is used) until it appears smallest. The position of the focusing object indicator then shows on its scale the distance at which the eye is focused at the particular vergence (in this case 20 ft.), that is, the point conjugate to the fovea for the convergence distance at which the test is made. As mentioned before, the scale is calibrated in dioptric distances, that is, the zero point indicates the position of the focusing object corresponding to infinity. Outwardly are distances in negative diopters, for example to $-1.75$ at the outermost point of the scale, and inwardly positive distances, down through $+2.50$ diopters (the distance of the small screen) to $+3.50$ diopters. The fixation distances, namely, 20 ft. and 40 cm. (0.164 D. and 2.50 D.) are also marked. Thus, whatever the fixation distance, location of the conjugate point inside that distance indicates myopia, and location outside thereof hyperopia.

For example, if a patient's right eye sees the point sharpest at a distance of 0.5 D., when looking at the 20 ft. fixation object, he is shortsighted to that extent and needs a minus lens to move the focus out to 0.164 D. If he sees the point sharpest with the focusing object for example at $-1.50$ D. when looking at the same fixation object, he is hyperopic and needs a plus lens to bring the focus back to fixation distance. This test is then made with the other eye after lighting the other focusing object (if the small instrument is used after rotating arm 225 about pivot 240 to bring it into proper alignment), and it will be understood that the points conjugate to the foveas of each eye may be on either side of the fixation distance.

On a compact instrument according to Fig. 26, the position at which the patient obtains clear vision is determined by the position of indicator 238 relative to scale 239. This scale indicates whether or not the refractive condition of the eye is normal or abnormal, and definitely determines the amount of refractive error, if any such defect is present. If the projected image of test object 228 (Fig. 27) is sharply perceived in a plane in front of the fixation chart 205, or to the side thereof towards the eye under test, the image is focused in front of the retina and the eye is myopic for that particular fixation distance. This shows that a minus correction of the amount indicated on the scale 239 is necessary. If the image is sharply projected in a plane at the rear of the fixation object 205, a plus correction of the amount indicated is necessary. It is to be understood that when it is desired to test the eyes on this instrument at a distance of approximately 20 ft., the prism and spherical lenses 213 and 214 are moved into the line of sight of the eyes to place the test means effectively at this distance from the eyes.

This test is usually repeated three times for each eye, the readings being commonly within a range of about +0.12 diopters. For example, if the average setting for the left eye shows that eye to be focused at —0.25 D. (0.41 D. beyond 20 feet=0.16 D.) and the average setting for the right eye shows the latter focused at +0.25 D. (0.09 D. inside twenty feet) the respective eyes would be focused at points at the same distances between infinity and 20 feet by using a +0.38 D. sphere before the right eye and a —.12 D. sphere before the left eye. For reasons which need not be discussed herein, the eyes should be focused at distances differing less than an eighth diopter (0.12 D.), whereas it is not necessary that they be focused at the fixation point. Generally speaking, it is even preferable if the points conjugate to the retinas are between +.25 D. and +1.0 D. (that is approximately at +0.5 D.) inside infinity when the eyes are used for distant vision.

Trial lenses effecting these corrections are now put before the eyes and the focus of each eye is again checked, which check should show both eyes to be focused at aproximately +0.50 D. If part of the power of a corrective lens is absorbed by an eye, the corrections must be changed and the patient retested with different test lens combinations until a balanced condition is effected.

In cases where the patient has difficulties in determining when the point light appears smallest, a focusing device according to Figs. 6 to 13 may be used, which does not require judgment of smallest size, but of the equal size of two objects, as explained with reference to these figures.

As pointed out above, if the patient reports that he sees a line as the clinician slowly moves the focusing object in from the end of the arm, astigmatism is indicated. The patient is now asked to turn the control wheel of the focusing object in question until he sees the line as sharp and thin as he can make it. Leaving the target in this position, the point object is changed to the three point combination by turning handle 771 and knob 774 (Figs. 21 to 24) relatively to each other until the three point mark appears in window 757, indicating that pin 772 has engaged notch 763. Instead of using this adjustable device, a focusing object similar to that shown in Figs. 17 to 19 can be used. In either case, the patient sees now three parallel lines, whose length depends upon the amount of the patient's astigmatism, and whose direction depends upon his axis of astigmatism. This appearance is schematically shown in Fig. 14. The investigator now turns handle 771 (Figs. 20, 21) or knob 185 (Fig. 18) until the previously staggered parallel lines form a single line as shown in Fig. 16. The position of the pointer on the protractor scale gives now accurately the axes of astigmatism. The other astigmatic meridian can be checked similarly, the two protractor readings being of course 90° apart.

In order to determine the amount of astigmatism, a focusing object according to Figs. 12 to 19 can be used, but preferably the line object 755 (Figs. 20 to 24) is presented to the eye in one of the patient's meridians of astigmatism, in a manner which will now be evident, by suitably operating knob 774 and handle 771. The patient is then told to turn the focusing object wheel until he makes the line as thin and narrow as possible, which position gives the dioptric distance of the astigmatic meridian in question. For determining the distance of the other astigmatic meridian, the test object is turned 90° and the test repeated, the difference of the two readings giving the amount of astigmatism or the interval of Sturm.

For example, the axis of the meridian of least power may be 180°, and the line test object appear thinnest in vertical position at a distance of —0.5 D. beyond 0.0 D. (infinity), and thinnest in horizontal position when set at +1.0 D. inside the zero point. The positions of the points conjugate to the retina, as imaged by the horizontal and vertical meridians of the lens system of the eye are then a half diopter beyond infinity and one diopter inside infinity respectively, and the amount of astigmatism is 1.50 D.

The clinician knows now exactly the correction needed by the patient. In the above example, since the focus should generally be at about +0.5 D., the correction will be either —0.5 D. sph. +150 D. Cyl. ax. 90°, or +1.0 D. sph. —1.50 D. cyl. ax. 180°. One of these corrections is put in the trial lens holders, and then checked by moving the point object which should now appear as smallest point at the distance of +0.5 D.

Small amounts of astigmatism, approximately below .5 D., cause, to the average patient, the point objects to elongate, but not to appear as a line. The focusing object according to Figs. 20 to 24 also permits the determination of astigmatism of such small amounts, by using the following procedure:

The patient is instructed to set the single point test object to present the smallest possible point. If he has any astigmatism, he will place the focusing object at such a distance that approximately the middle of Sturm's interval falls on his retina. The point is now changed to the line and the focusing device moved about .25 D. in the plus direction, inside the patient's chosen setting, which brings the line out of focus. The line is now rotated with the protractor handle, and the patient told to observe any change in the width of the line. If the width changes, a small amount of astigmatism is present, whose interval can be measured by reading position where the line appears thinnest, and the position where the line appears thinnest after having been turned 90°.

The axes of astigmatisms of low degree are determined by having the patient rotate the line into the position where it appears narrowest or thinnest. The protractor pointer will then approximately indicate the axis of the meridian of greatest power. The three point object is then presented, and the axis determined exactly, as described hereinbefore.

Such small degree astigmatism is then corrected similarly as described above.

With the compact instrument according to Fig. 26, the test for astigmatism is performed in analogous manner, astigmatic chart 229 (Fig. 27) being moved into alignment with the tubular member 231 so that it is visible to the eye under test. The astigmatic chart is first rotated until parallel to the axis of astigmatism, then moved back and forth longitudinally of the slideway 225 to a position wherein one group of lines is clear and distinct, and finally moved back and forth until the other group of lines is clear and distinct. The position at which each group of lines becomes clear and distinct as determined by the scale 239 indicates the astigmatic interval and the astigmatic meridian.

With these corrections as so far described in place, the patient should be able to set a single dot target to appear as a well defined and sharp, circular light point at the correct distance. If he cannot do this, the presence of irregular astigmatism is indicated.

For making tests in reading position, the arms are rotated, after loosening nut 459, until stops 442 touch faces 445, and nut 459 is again tightened. Screw 417 (Fig. 33) is then released, and bridge 425 lowered until extension 437 stops it at the correct angle of inclination. The head rest remains unchanged, the patient being told to lower his eyes without moving his head.

The tests are carried out substantially as described above for distant vision. A visual acuity test may be carried out with the chart on leaf 531 (Fig. 50) and phoria and fusional amplitude tests with a phoria chart of appropriate smaller size but otherwise similar to that shown in Fig. 64 and suitably placed on the near vision size target. For the phoria test, the focusing object is placed at +2.87 of the arm scale, which brings it in a position avoiding parallaxial movement of the point object. Otherwise, the procedure during these test steps is substantially similar to that described for the distant vision test.

The determination of the dioptric conditions for near vision is substantially analogous to that for far vision, as described. The entire instrument bridge with lens holders, mirrors and arms being tilted downwardly as above described, the eyes converge at point E (Fig. 1) at a distance of 2.5 D. It was found that a fixation chart with a central fixation dot, and in addition printed matter as shown in Fig. 50, is especially effective for the near vision dioptric test. It was found that for good near vision, the eyes should be preferably focused at points somewhat beyond the fixation or convergence point (instead of nearer as in distant vision), generally at about +2.25 D.

When making these near vision tests on the compact instrument, lenses 213 and 214 are moved out of the line of sight and the complete test means are tilted downwardly about pivots 256 to approximate reading position.

The tests concerning the ocular image conditions, that is the comparison of size or shape, or both, of the ocular image of one eye relative to size and shape of the ocular image of the other eye, are made under conditions quite similar to those in the investigation of dioptric and muscular defects, namely, with single binocular vision and with convergence at a definite fixation distance. The head of the patient remains in the same position as before, and, assuming that the size test for distant vision is made first, the instrument is again adjusted accordingly, by lifting the bridge. The ametropic correction lenses are in their proper cells, and the dials 475 and 476 of the devices for gradually changing the image size (without affecting the distance between image and eye) are set for zero magnification. As explained hereinbefore, the patient sees now the fixation mark with both eyes, with one eye black dots, and with the other one light spots, the configuration of fixation object, dots and spots being determined by the screen 546 (Fig. 55, A of Fig. 1). The black fixation mark, seen by both eyes, will be fused, but not the spots and dots, which, however, originating at the same points in space, subtend identical angles at each eye.

The patient is directed to look at the central fixation mark and, if he has fused binocular vision, he has no difficulty in fusing it. His attention is then directed to the four groups of light spots and black dots, and he is asked to judge the position of each light relatively to that of the corresponding dot, whereby he should look directly at each group and not at the fixation mark (which effects fusion without being directly observed), whereas he should, when changing his attention from one dot-spot group to another one, always make this change by going through direct observation of the fixation object. Screen 546 must be suitably illuminated, and lamps 562 lighted, the light intensities to be regulated for optimum visibility of spots and dots, as previously explained. If necessary, the spots and dots can be interchanged, as also described hereinbefore.

Figure 65:
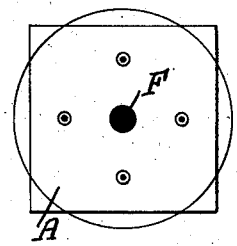
Figs. 65 to 73 are diagrammatical front views of size targets as they appear to eyes under various conditions.

If the patient has no ocular image discrepancy, the two appearances will coincide as indicated in Fig. 65. If he reports that he sees dots and spots at different places, an ocular image difference is indicated. It is preferable to let the patient observe pairs of dot and spot groups, as for example the upper and lower, and the right and left groups, respectively, which will then indicate vertical and horizontal size differences, respectively.

Figure 66:
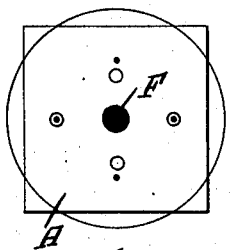
Figure 67:
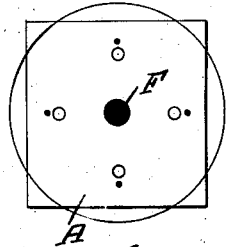
Figure 68:
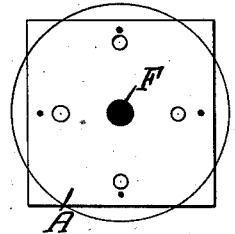
Figure 69:
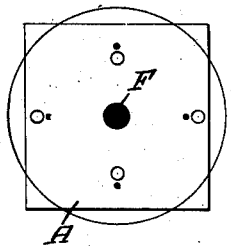

From the patient's report, the clinician is now able to deduce the presence, nature, and amount of size difference. There may be a meridional difference as for example indicated in Fig. 66, where there is a size difference symmetrical to the horizontal plane, or there may be a uniform overall size difference as indicated in Fig. 67. It will now be understood that many variations are possible in the relative positions of dots and spots. For example, there may be a combination of overall and meridional image difference (Fig. 68) or meridional size differences in opposite directions in the two axes (Fig. 69), the clinician's task being properly to interpret the various possibilities.

A patient may also equalize his ocular images by adjusting his dioptric condition, that is, a difference in the focus of one eye relative to the other at a certain convergence may exist which eliminates an existing size defect. If the dioptric balance is checked, and both eyes focused at the same distance, there may then appear an image difference not previously effective.

Figure 70:
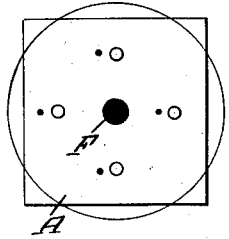
Figure 71:
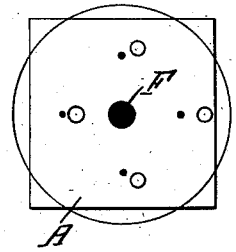

Further, lateral or vertical displacement in one direction may occur, as indicated in Figs. 70 and 71. In Fig. 70, there is a lateral displacement of images of equal size, whereas Fig. 71 indicates in addition an overall size difference shown by the larger diameter of the circle formed by the light spots, together with uniform displacement of the latter towards the right. This phenomenon is due to so-called fixation disparity which is probably correlated with phoria. It may be defined as that binocular condition where, due to mispointing of the eyes, the consequent misdirection of the visual fixation lines causes the image of the fixation point to fall on disparate retinal points. If the fixation point forms similar images in both eyes it is fused if it falls within the fusional areas and appears in the same direction. If the fixation point does not form similar images in both eyes, there will be no fusion; the points will appear to be separated and the amount of the separation will depend on the amount of fixation disparity. The direction of the displacement of the non-similar points generally follows that indicated in the phoria measurements taken with disassociated eyes as previously described. If the lights seen by the right eye appear to the left of the dots seen by the left eye, there is heteronymous displacement and the condition is exo-fixation disparity; if the lights are to the right of the dots there is homonymous dispacement and, consequently, eso-fixation disparity. Similarly, the vertical position of the lights indicates a right or left hyper-fixation disparity. The usual combinations of horizontal and vertical anomalies are possible.

Figure 72:
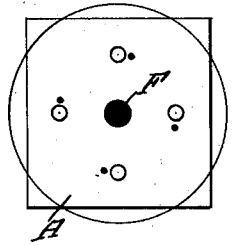

A so-called cyclo-disparity (corresponding to cyclo-phoria) is indicated if one pair of spots appears to be rotated with respect to the corresponding pair of dots. Thus, if the top spot is to the left of the top dot and the bottom spot is to the right of the bottom dot, the patient shows evidence of an excyclo-turning. A cyclo-declination of two degrees for the vertical meridian has been accepted as normal. The rotation of the horizontal meridian is generally less than that of the vertical meridian, and both tend to vary with convergence. Consequently the condition is more readily noticed in near tests. A simple case of this type is schematically shown in Fig. 72. It should be noted that there is a definite correlation of phoria measurements and fixation disparity data. However, phoria measurements, taken when there is no fusion and, in some cases, by the interposition of prisms, represent conditions in which the eyes are not functioning normally. Fixation disparity data, to the contrary, are obtained while the patient is using his eyes in a natural manner, with binocular vision in operation and the distortion incident to the use of prisms absent, so that the results of phoria tests with disassociated eyes, and of the above described test with binocular vision do not always correspond.

Figure 73:
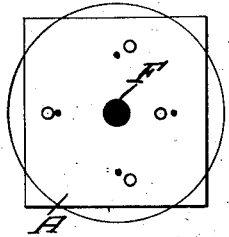

There are also cases where the image difference is quite irregular, as, for example, indicated in Fig. 73.

From the data obtained thus far the examiner knows the nature of the image difference, and will also have an indication of the direction of the fixation disparity. The next step is to evaluate and correct the size defect.

The size or shape, or both, of the ocular images are changed on the instrument, and these changes measured either by means of trial lens sets changing the size (either without having dioptric power or, if they have such power, with the latter suitably taken into account, for example by cancelling it out with a lens of opposite power), or, preferably, with the aid of devices for continuously changing the image size without changing the power, as described in the above-mentioned copending application Serial No. 713,701. In the instrument according to Fig. 33, provision is made for two such devices for each eye, one for overall image differences and one for meridional image differences. The magnification of these devices is gradually changed by means of wheels 475 and 476, and its amount determined with the aid of dials 475' and 476' (Fig. 35). With the aid of these devices, the clinician is able to change the image size of either eye overall as well as in any meridian, in accordance with the patient's observation of the relative positions of dots and spots. If lights and dots are equally separated, the eyes have ocular images of substantially equal size. If the patient reports unequal separations, as for example shown in Figs. 66 to 69, and 71, the image sizes are changed until the separation of dots and spots is equal. It will now be evident that this result can be attained either by increasing the magnification of one eye, or by decreasing it in the other eye. In this respect, the manner of correction will depend upon the characteristics of each case, and the clinician has to determine which corrective lens combination will best serve the purpose of correcting the patient's dioptric, muscular and ocular image defects.

In many cases, ocular image differences are associated with ametropia, usually a different ametropia of each eye. Such conditions always affect the ocular image relations, since every power lens changes the image size. Generally, anisometropic corrections may either tend to correct ocular image differences or even to reverse them, or to increase them. In any case, the corrections of the defects of different type are balanced, if necessary by repeating tests until the best correction is found. It is always advisable frequently to check the ametropic correction during the tests for ocular image differences, in order to ascertain whether the accommodation has changed. If it has, the dioptric condition is corrected with the proper power elements, and the ocular image relation again determined.

In general, the clinician, besides having the above-mentioned points in mind, must take into consideration the ocular condition of the patient as established by all the ocular tests. All of these facts will have an influence on the nature of the correction.

For example, a patient's ametropia was originally corrected with +1.00 D. sphere on each eye. The scale reading, after correction of the image difference, be +0.50 D. and +0.75 D. for the right and left eyes respectively. The difference between the two foci is therefore 0.25 D., and the question now arises whether to bring the right eye focus in to +0.75 D. or to carry the left eye focus out to +0.50 D. The decision involves consideration of three things, namely, the condition of the fixation disparity, the visual acuity, and the effect of power lenses on the image size. The right eye focus is brought to +0.75 D. if the patient shows eso-fixation disparity, if the visual acuity is not lowered and if the right ocular image tended to be the smaller one. The left eye focus is brought to +0.50 D. if the patient shows exo-fixation disparity; and if it seems more advisable to work toward a correction of the image difference through reduction in size of the left ocular image by lessening the plus sphere. The decision also may be affected by the advisability of not changing the image in the dominant eye. Any part of this procedure may be varied as the examiner sees fit. For instance, in the case cited above, if the patient shows exo-fixation disparity and the right ocular image is the smaller one, the examiner may decide that, despite the exo-fixation disparity he will use more positive power before the right eye for its effect in making the right ocular image larger. The use of the additional positive power may not increase the patient's exo-fixation disparity; or the increase may not be enough to be considered troublesome because he may have ample range of fusion. Consequently, it is on the examiner's thorough analysis of the different factors in each case as concomitantly detected on the new instrument, that he bases his procedure, which continues until image size and ametropic balance is obtained.

The effects achieved when the patient has been given equality of dioptric condition and image size are definite with respect to the factors of making the foci of the eyes and the relative size of the ocular images approximately equal. This correction is also apt to affect the fixation disparity. Lessening of both eso- and exo-fixation disparity has been noted from an equalization of the relative size of the ocular images alone. More noticeable, however, has been the tendency for vertical disparity to lessen or to disappear with proper dioptric and image size correction. The same is true in many cases where the position of the lights relative to the dots indicated that a small degree of cyclophoria was present.

After satisfactory correction has been determined for distant vision, the instrument is adjusted for near vision and the image size test repeated. Usually, the lens combination which gives optimum correction at 20 feet is first tried at near distance, to see whether it can be recommended for both conditions of vision. In many cases, however, the correction for near is different from that for distance, in amount or kind, or both. In such cases it is well to re-check the patient for distant vision with the correction found effective for near vision. This procedure may disclose a possibility for producing improved vision in both distances with a single correction, or indicate the necessity of different corrections for distant and near vision.

At the conclusion of the test, the examiner has a record of the corrective lenses found necessary for each eye. This record will comprise the amounts of spherical and cylindrical ametropia correction and the overall and meridional image size correction for each eye, and the axes of the cylindrical or meridional defects. Moreover, the distances of the various test lenses from the eyes is known. It is, moreover, evident that the test lenses used for correcting ametropia did not only effect a change of focus, but possibly also a size change, and that this size effect of the power lenses must be added to the pure size effect of the size correctives without power, in order to separate power and size effects.

With the aid of this clinical record, it is possible to prescribe for the patient spectacles that are equivalent to the correcting lenses determined during the test. In a few cases, it may be possible or necessary to wear glasses essentially similar to the test correctives; however, in most cases the spectacles will be different from, but designed to have an effect equivalent, to that of the trial lenses.

It will now be apparent how the above described tests can be carried out on a compact instrument according to Fig. 26. The essential difference consists in the fact that with the latter instrument, the single target is optically moved to different distances and mechanically lowered into reading position, and that the single focusing object has to be brought into alignment with the eye that is tested for dioptric defects. Otherwise, the test procedure is essentially the same.

It will now be understood that my new test method evaluates absolutely, while inherently, correct and precise, all dioptric, muscular and image difference defects as they actually exist severally and as they influence one another, not with the aid of consecutive separate examinations, but concomitantly and therefore independent of circumstances which may obscure their interrelation and dependency.

It should be understood that the present disclosure is for the purpose of illustration only and that this invention includes all modifications and equivalents which fall within the scope of the appended claims.

I claim:

1. A device for testing binocular vision comprising means for positioning the eyes of a patient, a test target directly in front of the eyes including means determining the dimensional arrangement of a test pattern and means presenting said pattern as non-fusibly different in appearance to the respective eyes for comparison of the ocular images thereof formed through said eyes at a certain vergence determined by said target, means for adjusting the dimensional relation of said ocular images, and means for concomitantly measuring dioptric defects of each of said eyes substantially at said vergence.

2. A device for testing binocular vision comprising means for positioning the eyes of a patient, a test target directly in front of the eyes including means determining the dimensional arrangement of a test pattern and means presenting said pattern as non-fusibly different in appearance to the respective eyes for comparison of the ocular images thereof formed through said eyes at a certain vergence determined by said target, means for adjusting the dimensional relation of said ocular images, and means on either side of said target, in deviated visual axes of said eyes, for concomitantly measuring dioptric defects of each of said eyes substantially at said vergence.

3. A device for testing binocular vision comprising means for positioning the eyes of a patient, a test target directly in front of the eyes including means determining the dimensional arrangement of a test pattern and means presenting said pattern as non-fusibly different in appearance to the respective eyes for comparison of the ocular images thereof formed through said eyes at a certain vergence determined by said target, means for adjusting the dimensional relation of said ocular images and likewise directly in front of both eyes means for concomitantly measuring dioptric defects of each of said eyes substantially at said vergence.

4. A device for testing binocular vision comprising a focusing object for measuring dioptric defects of the eyes, a test target directly in front of both eyes including means for presenting to the eyes a test object having spaced elements defining for both eyes a pattern of single dimensional relationship and means causing said pattern to appear non-fusibly different in the ocular images of the respective eyes, for comparison of said ocular images, means determining the vergence of the eyes when looking at said objects, and lens means between the eyes and said objects for optically changing said vergence.

5. A device for testing binocular vision comprising means for fixing the vergence of the eyes, means for directly measuring dioptric defects of the eyes at said vergence, test objects of dissimilar, non-fusible character in front of both eyes and in substantially the same apparent plane as said fixation means, and means for presenting to the respective eyes likenesses of different ones of said test objects, said likenesses being similarly arranged with respect to said fixation means but of dissimilar, non-fusible character.

6. A device for testing binocular vision comprising means for fixing the vergence of the eyes, means for directly measuring dioptric defects of the eyes at said vergence, test objects of dissimilar, non-fusible character in front of both eyes and in substantially the same apparent plane as said fixation means, means for presenting to the respective eyes likenesses of different ones of said test objects, said likenesses being similarly arranged with respect to said fixation means but of dissimilar, non-fusible character, and means for evaluating and correcting apparent discrepancies in the spatial arrangement of said likenesses as determined by binocular fusion.

7. A device for testing binocular vision comprising in the direct line of vision a target having a fixation mark and presenting to each eye the appearance of detail, said appearances being similarly arranged relative to said mark but of dissimilar, non-fusible character, a focusing object outside the field of vision covered by said target, means for virtually superposing said focusing object upon said fixation mark, and means for adjusting the position of said object for maintaining said superposition for different convergencies corresponding to different distances of said target.

8. A device for testing binocular vision comprising means for fixating the vergence of the eyes, target means for presenting to each eye a different appearance of detail, said appearances being similarly arranged with respect to said fixation means but of dissimilar, non-fusible character, and focusing means for determining the dioptric conditions of the eyes at said vergence, said fixation means, said target means and said focusing means being in the direct line of vision of the eyes.

9. A device for testing binocular vision comprising a target for presenting to each eye a different appearance of detail, said appearances being similarly arranged with respect to a vergence fixation mark associated with said target, but of dissimilar, non-fusible character, said target having a transparent portion substantially coinciding with said fixation mark, means for testing dioptric defects visible through said transparent portion, and means for adjusting the distance between said fixation mark and said dioptric test means.

10. A device for testing binocular vision comprising means for positioning the head of a patient, in the direct line of vision a target for evaluating binocular image differences at a certain vergence, a focusing object, means for the apparent superposition of said object and said target at said vergence, means for adjusting the distance of said object from the eyes, and a lens intermediate said object and the eye looking thereat, fixed at its focal distance from said eye for substantially maintaining the apparent size of said object.

11. A device for testing binocular vision comprising means for positioning the eyes of a patient, a focusing object directly visible in front of the eyes, a target means also directly visible at a predetermined distance in front of the eyes for presenting to the eyes a test pattern for comparison of the ocular images thereof and having a portion traversable for said object, and means for bringing said object into focus on opposite sides of said target means.

12. A device for testing binocular vision comprising means for positioning the eyes of a patient, focusing means directly visible in front of the eyes, a target means at a predetermined distance directly visible in front of the eyes and having a portion traversable for said focusing means, means for aligning said focusing means with either one of the eyes and for adjusting its distance from said eye.

13. A device for testing binocular vision comprising means for positioning the eyes of a patient, means for producing an aerial focusing image directly visible in front of the eyes, a target means at a predetermined distance directly visible in front of the eyes, and having a portion traversable for said image, and means for aligning said image with either one of the eyes and for adjusting its distance from said eye.

14. A device for testing binocular vision comprising means for positioning the head of the patient; a rigid frame swingingly associated with said positioning means to rotate about an axis approximately through the centers of rotation of the eyes; and vergence fixation means, a size target and a focusing object mounted on said frame in front of both eyes for direct and simultaneous observation thereof.

15. A device for testing binocular vision comprising means for positioning the head of the patient, focusing means for measuring dioptric defects of the eyes at a certain vergence, means for evaluating muscular defects including a phoria chart placed in the direct line of vision for binocular fusion at said vergence, target means in said direct line of vision for evaluating image difference defects of the eyes at said vergence, means for changing said vergence and the inclination of said line of vision relatively to said positioning means, and means for correcting said dioptric, muscular and image difference defects.

16. A device for testing binocular vision comprising means for positioning the eyes of a patient, means for presenting to the eyes at a predetermined distance from said positioning means a test object having spaced elements defining for both eyes a pattern of single dimensional relationship, means causing said pattern to appear non-fusibly different in the ocular images of the respective eyes, and means for adjusting the relative dimensions of the appearances of said test object whereby said ocular images can be compared.

17. A device for testing binocular vision comprising means for positioning the eyes of a patient, means for presenting to the eyes at a predetermined distance from said positioning means a test object having a fixation element and spaced therefrom a test element, said elements defining for both eyes a pattern of single dimensional relationship, means causing said test element to appear non-fusibly different in the ocular images of the respective eyes, and means for adjusting the relative dimensions of said test object whereby said ocular images can be compared.

18. A device for testing binocular vision comprising means for positioning the eyes of a patient, means for presenting to the eyes at a predetermined distance from said positioning means a test object having spaced elements defining for both eyes a pattern of single dimensional relationship, means associated with the respective eyes for imparting to at least one of said elements characteristics rendering them non-fusibly different for the respective eyes, and means for exchanging said differentiating means between the respective eyes.

19. A device for testing binocular vision comprising means for positioning the eyes of a patient, a target in front of both eyes including test means presenting to the eyes the appearance of two non-fusibly different objects having elements for congruence comparison and screening means intermediate the eyes and said test means for presenting to each eye one of said objects in identical spatial arrangement, support means determining the relative position of target and eyes, and means for differentiating the appearance of said objects from that of said screening means.

20. A device for testing eyes comprising means for positioning the head of a patient, a unitary target means placed at for practical purposes infinite distance from said positioning means substantially in a horizontal line directly in front of both eyes, said target means having spaced elements defining for both eyes a pattern of single dimensional relationship and means causing said pattern to appear non-fusibly different in the ocular images of the respective eyes, and a second similar target means directly before said supporting means at reading distance in a downwardly inclined line, said second target means being placed for substantially unobstructed observation of said first target means.

21. A device for testing binocular vision comprising means for positioning the head, a target in the direct line of vision including fixation means for determining the vergence of the eyes, test means presenting to the eyes the appearance of two objects of dissimilar character and differentiating means for presenting to the eyes said objects in identical spatial arrangement relatively to said fixation means, means determining the relative position of target and eyes, and means for evaluating discrepancies in the appearance of said objects.

22. A device according to claim 21 further characterized by means for positioning the head of the patient and means for changing the position of said fixation means and said target means relative to the head of the patient with the position of the head remaining unchanged.

23. A device according to claim 21 further characterized by lenses interposed before the eyes for optically changing the visual distance between the eyes and said fixation and test means.

24. A device for testing binocular vision comprising means for positioning the head of the patient, a single target means located in front of both eyes for direct and simultaneous observation thereof for evaluating differences of the ocular images of the eyes, and means for tilting said target means about a line substantially through the centers of rotation of the eyes, while maintaining the position of the head.

25. A device for testing binocular vision comprising a light obstructing means with a fixation object for converging the eyes at a given distance and a perforation therein, and two objects of different character placed behind said perforation, said objects being so arranged that each object is visible to only one eye, said perforation presenting to the eyes non-fusible appearances similarly placed with respect to said fixation object.

26. A device for testing binocular vision comprising in fixed relation to the eyes an opaque shield illuminated from the front, a fixation mark on said shield determining the convergence of the eyes, a small light transmitting area in said shield, and behind said area two dissimilar objects so arranged that each object can only be seen by a different eye, said shield thereby presenting to the respective eyes dissimilar test objects similarly spaced with respect to said mark.

27. A device for testing binocular vision comprising in fixed relation to the eyes a shield with an opening therein, a light source behind said shield, an opaque screen having an edge for partly obstructing said light between said source and said shield, said edge being arranged along a substantially vertical line so that only one eye perceives said light, and means for moving said screen to the other side of said line so that after said change only the other eye perceives said light.

28. A device for testing binocular vision comprising in fixed relation to the eyes a shield having a fixation mark and openings symmetrically arranged around said mark, light sources in the axes of vision from the eyes through said perforations, tubular members between said shield and said sources, and screens intermediate said members and said sources each having a substantially vertical edge so arranged in said axes that only one eye perceives said sources through said openings, the other eye seeing said perforations as dark dots.

29. A device for testing binocular vision comprising a shield in fixed relation to the eyes having an opening, a light source behind said opening, screening means intermediate said shield and said source arranged for occluding for one eye perception of said source through said opening, and lens means intermediate said screening means and said shield for optically increasing the distance between the screening means and the shield in order to secure obstruction of said source from said eye while maintaining a comparatively short distance between said shield and said screening means.

30. A device for testing binocular vision comprising means for positioning the head of the patient, two targets arranged in predetermined relation to said positioning means, each having a fixation mark and presenting to each eye the appearance of detail, said appearances being of similar arrangement relative to said fixation mark but of dissimilar, non-fusible character, one of said targets being arranged for near vision and the other for distant vision, and means for making one or the other target ineffective.

31. A device according to claim 30 further characterized in that one target is arranged for distant observation along a substantially horizontal line of vision, and the other for near observation along a downwardly inclined line of vision.

32. A device according to claim 30 further characterized in that the appearances of said two targets are substantially alike, the angles of vision subtended at the eyes from corresponding points of said appearances being substantially equal.

33. A device for testing binocular vision comprising head positioning means, a direct vision size target for straight ahead observation at a distance approximating infinity, a similar target tilted and at a shorter distance approximating reading position, a focusing object laterally removed from the direct field of vision, optical means for providing an image of said object in the direct line of vision, and means for moving said object and said optical means to obtain superposition of said image upon either of said targets.

34. A device for testing eyes comprising head positioning means, an instrument support, means for adjusting said support relatively to said positioning means linearly within a plane, and means for rotatably adjusting said support about a line in said plane, said adjusting means being correlated to replace rotation of said support about an axis parallel to said line outside said plane.

35. A device for testing binocular vision comprising a size target structure in the direct line of vision of both eyes, and diaphragms with openings of different contour intermediate the eyes and said target, said diaphragms shielding the marginal portions of said target structure with an outline different for each eye, thereby preventing fusion of said structure.

36. In a device of the character described, a head rest, means for straight line adjustment of said head rest along three axes, means for rotatory adjustment of said head rest about each of said three axes, and scale means for measuring said adjustments.

37. A device for determining the dioptric condition of an eye comprising means for positioning the head of a patient, two small light sources spaced different distances from the eye and located substantially along the line of vision but slightly displaced on opposite sides of said line of vision to be separately visible, and means for adjusting the distance between said sources and said positioning means.

38. A device for determining the dioptric condition of an eye comprising means for positioning the eye of a patient, a small source of light, means providing an image of said source, said image and said source being spaced different distances from the eye and located substantially along the line of vision but slightly displaced on opposite sides of said line of vision to be separately visible, and means for adjusting and measuring the distance between said source and the eye.

39. A device for determining the dioptric condition of an eye comprising a housing, a plurality of test objects on a common support, means for fitting said support for presenting to the eye one of said test objects as a wall of said housing, a light source in said housing concealed from the eye and illuminating the test object, lens means intermediate the eye and the object for projecting an image of said object towards the eye, and means for adjusting the distance between said image and the eye.

40. A device according to claim 39 further characterized in that one of said objects is an astigmatic chart having means for rotatory adjustment thereof.

41. A device for determining the dioptric condition of an eye comprising a rotatably mounted support in the line of vision of the eyes, means for positioning the eye, several small light reflecting balls arranged in a straight row on said support, a light source shielded from the eye for illuminating said balls, means for rotating said row within a plane substantially perpendicular to the line of vision, means for measuring the inclination of said row within said plane, and means for adjusting the distance between the eye and said balls.

42. A device for determining the dioptric condition of an eye comprising a support, means on said support for positioning the head of a patient, a housing slidably mounted for adjustment on said support along the line of vision of the patient, a small substantially opaque highly reflecting object in said housing for directing light along said line of vision into an eye of the patient, a source of light on said housing hidden from the eye for illuminating said object, and means for measuring the amount of said adjustment.

43. A device for determining the dioptric condition of an eye comprising means for positioning the eye, two closely juxtaposed light-issuing objects appearing substantially point shaped arranged for simultaneous vision by said eye at substantially equal distance from the eye, a rotatably mounted support for said objects, means for adjusting the distance from said objects to the eye along the line of sight, and means for rotating said support about an axis substantially parallel to said line.

44. A focus measuring device comprising a light source, an opaque screen between the eye and said source, said screen having transparent portions representing three objects, namely, a star point in the center of the screen, star points aligned adjacent to said central point and a thin line radially extending from said central point, a mask adjustable relatively to said screen and adapted selectively to obscure any two of said objects, means for measurably rotating said screen and said mask, and means for adjusting the optical distance between said screen and the eye.

45. A focusing device comprising a rotatably mounted support, mounted on said support as focusing objects a group of several aligned star points and a thin light issuing line, and masking means movably mounted on said support for obscuring part of said group, for selectively presenting to the eye one of said star points, a group of aligned star points or a star point and said line.

46. A focusing device comprising a rotatably mounted support, mounted on said support as focusing objects a group of several aligned star points and a thin light issuing line, masking means movably mounted on said support for obscuring part of said group, for selectively presenting to the eye one of said star points, a group of aligned star points, or a star point with said line and means for measurably rotating the selected object about a line in the direction of the optical axis of the eye.

47. The method of testing binocular vision for dioptric defects and for incongruities of the ocular images of the respective eyes comprising measuring the distance from each eye of points conjugate to the retinas of the eyes while the convergence of the eyes is determined by looking at a fixation object, substantially correcting dioptric defects found in this manner, presenting to the dioptrically corrected eyes directly in front thereof a test object having spaced elements defining for both eyes a pattern of single dimensional relationship while causing said pattern to appear non-fusibly different for the respective eyes, changing the relative dimensions of said ocular images of said pattern to compensate for the magnification difference due to said dioptric correction and any eikonic error that may be present in the eyes, until said elements assume a predetermined location in superposed appearance, and determining the amount of said change.

48. The method of testing binocular vision for incongruities of the ocular images of the respective eyes, which comprises presenting to the eyes a test object having spaced elements defining for both eyes a pattern of single dimensional relationship, while causing said pattern to appear non-fusibly different for the respective eyes, changing the relative dimensions of said ocular images of said pattern until said elements assume a predetermined location in superposed appearance, and determining the amount of said change.

49. The method of testing binocular vision for incongruities of the ocular images of the respective eyes, which comprises presenting to the eyes a test object having a fixation element and spaced therefrom a test element, said elements defining for both eyes a pattern of single dimensional relationship, while causing said test element to appear non-fusibly different for the respective eyes, changing the relative dimensions of said ocular images of said pattern until said elements assume a predetermined location in superposed appearance, and determining the amount of said change.

50. The method of testing binocular vision for incongruities of the ocular images of the respective eyes, which comprises presenting to the eyes a test object having spaced elements defining for both eyes a pattern of single dimensional relationship, while causing at least one of said elements to appear non-fusibly different for the respective eyes, changing the relative dimensions of said ocular images of said pattern until said elements assume a predetermined location in superposed appearance, and determining the amount of said change.

ADELBERT AMES, Jr.